US012242916B2

(12) United States Patent
Plummer et al.

(10) Patent No.: US 12,242,916 B2
(45) Date of Patent: Mar. 4, 2025

(54) SYSTEMS AND METHODS FOR TRACKING ITEMS

(71) Applicant: Divine Logic, Inc., Fresno, CA (US)

(72) Inventors: Stephen Plummer, Fresno, CA (US); Alexander Plummer, Fresno, CA (US); Brandon Lundberg, Fresno, CA (US)

(*) Notice: Subject to any disclaimer, the term of this patent is extended or adjusted under 35 U.S.C. 154(b) by 213 days.

(21) Appl. No.: 17/988,706

(22) Filed: Nov. 16, 2022

(65) Prior Publication Data

US 2023/0092401 A1 Mar. 23, 2023

Related U.S. Application Data

(63) Continuation-in-part of application No. 17/740,317, filed on May 9, 2022, now abandoned, which is a (Continued)

(51) Int. Cl.
*G06K 7/10* (2006.01)
*G06K 7/14* (2006.01)
(Continued)

(52) U.S. Cl.
CPC ....... *G06K 7/10722* (2013.01); *G06K 7/1413* (2013.01); *G06T 5/80* (2024.01);
(Continued)

(58) Field of Classification Search
CPC ............. G06K 7/10722; G06K 7/1413; G06K 19/06037; G06T 5/80; G06T 7/248;
(Continued)

(56) References Cited

U.S. PATENT DOCUMENTS

| 4,684,247 A | 8/1987 | Hammill, III |
| 5,051,906 A | 9/1991 | Evans, Jr. et al. |

(Continued)

FOREIGN PATENT DOCUMENTS

| EP | 0367526 A2 | 5/1990 |
| EP | 1437636 A1 | 7/2004 |

(Continued)

OTHER PUBLICATIONS

Indian Patent Application 1987/CHE/2008 English language document.

(Continued)

*Primary Examiner* — Seung H Lee
(74) *Attorney, Agent, or Firm* — Sierra IP Law, PC; William K. Nelson

(57) ABSTRACT

The present invention provides systems and methods for tracking items (e.g., commodities, goods, containers, boxes, packages, etc.) through transportations to multiple locations to allow the position(s) and movement(s) of such items to be accurately tracked and documented, and to allow such items to be quickly identified and located based on tracking records kept within the tracking system. The system may utilize image sensors, image recognition and processes software, position translation software, and a virtual model of the pre-defined space in order to track objects within the defined space and maintain a record of the movement(s) and position(s) of the object within the pre-defined space.

20 Claims, 14 Drawing Sheets

Related U.S. Application Data continuation of application No. 17/537,499, filed on Nov. 30, 2021, now abandoned, which is a continuation of application No. 17/408,752, filed on Aug. 23, 2021, now abandoned, which is a continuation of application No. 16/892,290, filed on Jun. 4, 2020, now Pat. No. 11,100,300, which is a continuation of application No. 16/194,764, filed on Nov. 19, 2018, now Pat. No. 10,685,197.

(60) Provisional application No. 63/310,762, filed on Feb. 16, 2022, provisional application No. 62/675,772, filed on May 24, 2018, provisional application No. 62/588,261, filed on Nov. 17, 2017.

(51) Int. Cl.
| | | |
|---|---|---|
| *G06T 5/80* | (2024.01) | |
| *G06T 7/246* | (2017.01) | |
| *G06T 7/536* | (2017.01) | |
| *G06T 7/73* | (2017.01) | |
| *G06T 3/02* | (2024.01) | |
| *H04N 23/90* | (2023.01) | |

(52) U.S. Cl.
CPC ............ *G06T 7/248* (2017.01); *G06T 7/536* (2017.01); *G06T 7/73* (2017.01); *G06T 7/74* (2017.01); *G06T 3/02* (2024.01); *G06T 2207/30204* (2013.01); *G06T 2207/30244* (2013.01); *H04N 23/90* (2023.01)

(58) Field of Classification Search
CPC .. G06T 7/536; G06T 7/73; G06T 7/74; G06T 3/02; G06T 2207/30204; G06T 2207/30244; H04N 23/90
See application file for complete search history.

(56) References Cited

U.S. PATENT DOCUMENTS

| | | | |
|---|---|---|---|
| 5,059,789 | A | 10/1991 | Salcudean |
| 5,193,124 | A | 3/1993 | Subbarao |
| 5,367,458 | A | 11/1994 | Roberts et al. |
| 5,525,883 | A | 6/1996 | Avitzour |
| 5,602,760 | A | 2/1997 | Chacon et al. |
| 5,604,715 | A | 2/1997 | Aman et al. |
| 5,617,335 | A | 4/1997 | Hasima et al. |
| 5,691,527 | A | 11/1997 | Hara et al. |
| 5,726,435 | A | 3/1998 | Hara et al. |
| 5,745,036 | A | 4/1998 | Clare |
| 5,793,934 | A | 8/1998 | Bauer |
| 5,828,770 | A | 10/1998 | Leis et al. |
| 5,832,139 | A | 11/1998 | Batterman et al. |
| 5,893,043 | A | 4/1999 | Moehlenbrink et al. |
| 6,064,749 | A | 5/2000 | Hirota et al. |
| 6,078,849 | A | 6/2000 | Brady et al. |
| 6,173,066 | B1 | 1/2001 | Peurach et al. |
| 6,175,644 | B1 | 1/2001 | Scola et al. |
| 6,266,008 | B1 | 7/2001 | Huston et al. |
| 6,305,891 | B1 | 10/2001 | Burlingame |
| 6,434,254 | B1 | 8/2002 | Wixson |
| 6,542,824 | B1 | 4/2003 | Berstis |
| 6,556,722 | B1 | 4/2003 | Russell et al. |
| 6,661,449 | B1 | 12/2003 | Sogawa |
| 6,697,761 | B2 | 2/2004 | Akatsuka et al. |
| 6,728,582 | B1 | 4/2004 | Wallack |
| 6,732,045 | B1 | 5/2004 | Irmer |
| 6,750,769 | B1 | 6/2004 | Smith |
| 6,859,729 | B2 | 2/2005 | Breakfield et al. |
| 6,919,880 | B2 | 7/2005 | Morrison et al. |
| 6,934,540 | B2 | 8/2005 | Twitchell, Jr. |
| 6,952,488 | B2 | 10/2005 | Kelly et al. |
| 7,013,026 | B2 | 3/2006 | Takehara et al. |
| 7,032,823 | B2 | 4/2006 | Nojiri |
| 7,164,359 | B2 | 1/2007 | Waterhouse et al. |
| 7,194,330 | B2 | 3/2007 | Carson |
| 7,298,314 | B2 | 11/2007 | Schantz et al. |
| 7,339,469 | B2 | 3/2008 | Braun |
| 7,370,803 | B2 | 5/2008 | Mueller et al. |
| 7,372,451 | B2 | 5/2008 | Dempski |
| 7,468,821 | B2 | 12/2008 | Hashiguchi et al. |
| 7,512,262 | B2 | 3/2009 | Criminisi et al. |
| 7,616,156 | B2 | 11/2009 | Smith et al. |
| 7,646,336 | B2 | 1/2010 | Tan et al. |
| 7,663,671 | B2 | 2/2010 | Gallagher et al. |
| 7,667,646 | B2 | 2/2010 | Kalliola et al. |
| 7,681,796 | B2 | 3/2010 | Cato et al. |
| 7,721,967 | B2 | 5/2010 | Mueller et al. |
| 7,845,560 | B2 | 12/2010 | Emanuel et al. |
| 7,864,159 | B2 | 1/2011 | Sweetser et al. |
| 7,957,833 | B2 | 6/2011 | Beucher et al. |
| 8,144,920 | B2 | 3/2012 | Kansal et al. |
| 8,196,835 | B2* | 6/2012 | Emanuel .................. G01S 5/16 235/472.01 |
| 8,279,069 | B2 | 10/2012 | Sawyer |
| 8,280,173 | B2 | 10/2012 | Kato et al. |
| 8,284,045 | B2 | 10/2012 | Twitchell, Jr. |
| 8,358,099 | B2 | 1/2013 | Yamaguchi |
| 8,381,982 | B2 | 2/2013 | Kunzig et al. |
| 8,526,672 | B2 | 9/2013 | Momoi |
| 8,561,897 | B2 | 10/2013 | Kunzig et al. |
| 8,565,913 | B2 | 10/2013 | Emanuel et al. |
| 8,582,867 | B2 | 11/2013 | Litvak |
| 8,805,002 | B2 | 8/2014 | BenHimane et al. |
| 8,831,352 | B2 | 9/2014 | Gao et al. |
| 8,836,575 | B2 | 9/2014 | Nishiyama |
| 8,903,430 | B2 | 12/2014 | Sands et al. |
| 8,913,792 | B2 | 12/2014 | BenHimane et al. |
| 9,341,720 | B2 | 5/2016 | Garin et al. |
| 9,342,724 | B2 | 5/2016 | McCloskey et al. |
| 9,357,181 | B2 | 5/2016 | Fujimatsu et al. |
| 9,607,388 | B2 | 3/2017 | Lin et al. |
| 9,626,709 | B2 | 4/2017 | Koch et al. |
| 9,779,286 | B2 | 10/2017 | Morishita |
| 9,875,579 | B2 | 1/2018 | Menozzi et al. |
| 9,946,963 | B2 | 4/2018 | Samara et al. |
| 9,990,733 | B2 | 6/2018 | Tsuji |
| 10,019,693 | B2 | 7/2018 | Wolf et al. |
| 10,019,878 | B2 | 7/2018 | Mains, Jr. |
| 10,181,197 | B2 | 1/2019 | Hirasawa et al. |
| 10,552,964 | B2 | 2/2020 | Tsuji |
| 10,685,197 | B2 | 6/2020 | Plummer et al. |
| 11,292,463 | B2 | 4/2022 | Hardy et al. |
| 2003/0144813 | A1 | 7/2003 | Takemoto et al. |
| 2004/0016077 | A1 | 1/2004 | Song et al. |
| 2004/0183751 | A1 | 9/2004 | Dempski |
| 2006/0132311 | A1 | 6/2006 | Kruest et al. |
| 2006/0184013 | A1 | 8/2006 | Emanuel et al. |
| 2008/0226130 | A1 | 9/2008 | Kansal et al. |
| 2010/0091096 | A1 | 4/2010 | Oikawa et al. |
| 2011/0121068 | A1 | 5/2011 | Emanuel et al. |
| 2012/0251011 | A1 | 10/2012 | Gao et al. |
| 2013/0043826 | A1 | 2/2013 | Workman et al. |
| 2013/0050502 | A1 | 2/2013 | Saito et al. |
| 2013/0200811 | A1 | 8/2013 | Steininger et al. |
| 2014/0247278 | A1 | 9/2014 | Samara et al. |
| 2014/0285133 | A1 | 9/2014 | Toledo et al. |
| 2015/0302500 | A1 | 10/2015 | Koch et al. |
| 2015/0356345 | A1 | 12/2015 | Velozo et al. |
| 2016/0110976 | A1 | 4/2016 | Mains, Jr. |
| 2016/0203357 | A1 | 7/2016 | Morishita |
| 2016/0247318 | A2 | 8/2016 | Menozzi et al. |
| 2016/0335780 | A1 | 11/2016 | Tsuji |
| 2017/0014203 | A1 | 1/2017 | De Mathelin et al. |
| 2017/0091704 | A1 | 3/2017 | Wolf et al. |

(56) References Cited

U.S. PATENT DOCUMENTS

2017/0109875 A1 4/2017 Shevchenko et al.
2020/0110526 A1 4/2020 Ano et al.

FOREIGN PATENT DOCUMENTS

| EP | 2695134 A2 | 2/2014 |
|---|---|---|
| IN | 1987CHE2008 A | 2/2010 |
| WO | 2019100011 A1 | 5/2019 |

OTHER PUBLICATIONS

A new method of camera pose estimation using 2D-3D corner correspondence, by Shi et al., publication; Apr. 15, 2004. Available online; "https://www.sciencedirect.com/science/article/abs/pii/S0167865504000790?via%3Dihub".

Pose Determination of a Three-Dimensional Object Using Triangle Pairs, by Linnainmaa et al., from IEEE Transactions on Pattern Analysis and Machine Intelligence, vol. 10. No. 5. Sep. 1988. Available online; "https://ieeexplore.ieee.org/document/6772".

International search report for PCT/US2005/043755, mailing date Nov. 6, 2006. Available online; "https://patentscope.wipo.int/search/en/detail.jsf?docPN=EP1828862".

NASA Technical Memorandum 107144, Feb. 1996, Color Image Processing and Object Tracking System, by Klimek et al. Available online; "https://ntrs.nasa.gov/citations/19960016954".

Off-Grid Solar Power in Rural India, Author Pratima Bisen Kanudia, ETSAP meeting, Lisbon, Dec. 10, 2012, available online; "chrome-extension://efaidnbmnnnibpcajpcglclefindmkaj/https://iea-etsap.org/workshop/lisbon_dec2012/pb_off-grid%20solar%20power%20in%20rural%20india.pdf".

International Application No. PCT/US18/61839—International Search Report and Written Opinion. World Intellectual Property Organization International Search Authority, Mar. 7, 2019.

Examination report No. 1 for Australian patent application No. 2018368776.

Original document of EP2695134A2 as WO2012138585A2, available online; "https://worldwide.espacenet.com/patent/search/family/046927345/publication/EP2695134A2?q=pn%3DEP2695134A2".

Original document of EP0367526A2, available online; "https://worldwide.espacenet.com/patent/search/family/023009429/publication/EP0367526A2?q=pn%3DEP0367526A2".

Original document of EP1437636A1, available online; "https://worldwide.espacenet.com/patent/search/family/032501497/publication/EP1437636A1?q=pn%3DEP1437636A1".

Original document of WO2019100011A1, available online; "https://worldwide.espacenet.com/patent/search/family/066532409/publication/WO2019100011A1?q=pn%3DWO2019100011A1".

U.S. Appl. No. 60/635,813 original document.

\* cited by examiner

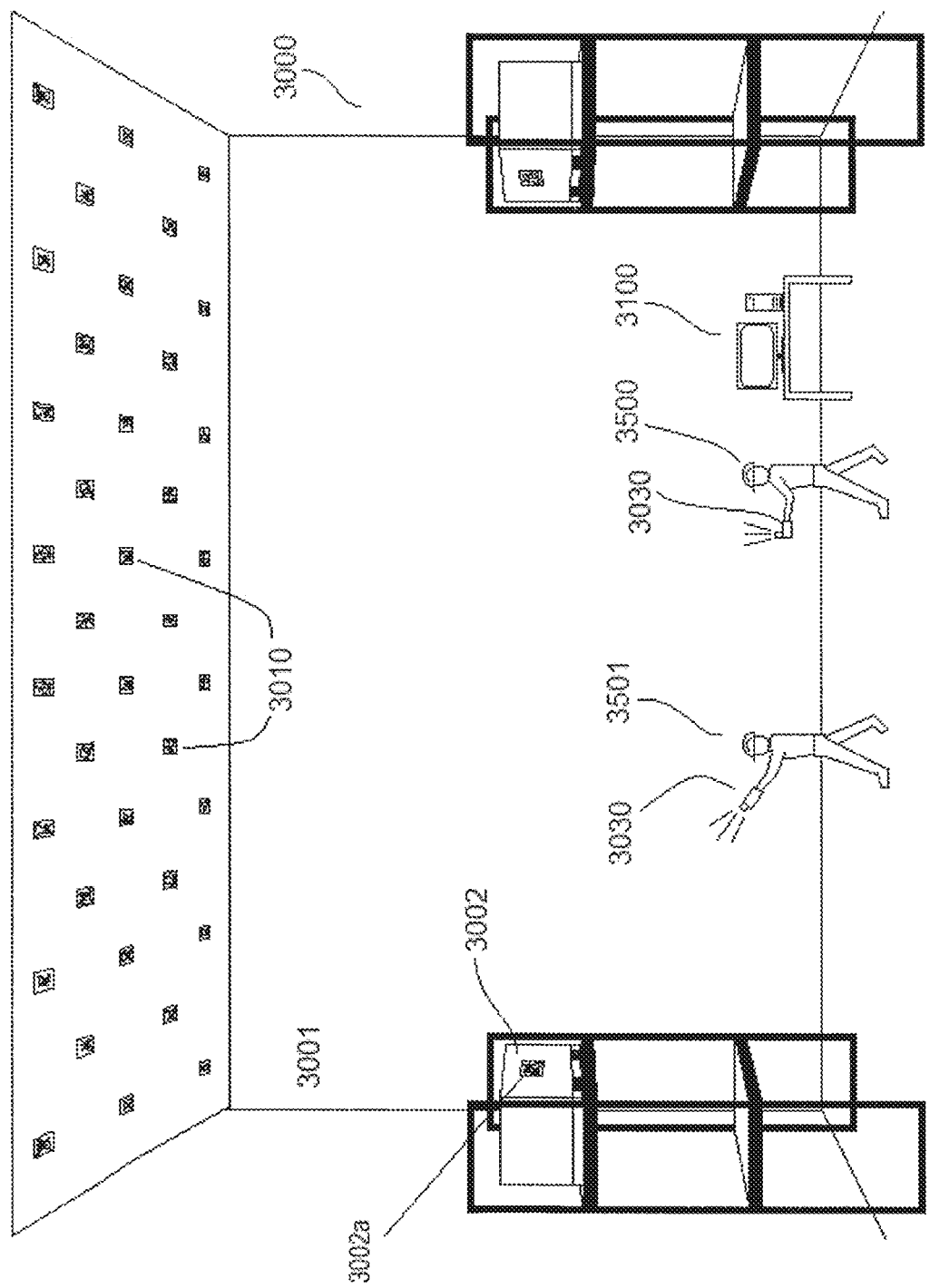

SYSTEMS AND METHODS FOR TRACKING ITEMS

FIELD OF THE INVENTION

The present invention relates to material-handling systems and methods of tracking designated materials or containers, and more particularly to automated systems for tracking the real-time locations of designated materials or containers.

DISCUSSION OF THE BACKGROUND

Many systems exist for tracking items such as packaged goods, shipping containers, warehouse bins and boxes, vehicles, and other items. Conventional tracking systems have their strengths and weaknesses. Automation of such systems is a continuing goal toward which some progress has been made, but there are many improvements to be made to existing tracking systems.

Additionally, various conventional tracking systems have used manned vehicles or automated vehicles for transporting and retrieving the tracked items. Both manned and automated transport vehicles (e.g., motorized pallet jacks, forklift trucks, buggies, and carts) have been used in factories, warehouses, and distribution centers to move tracked items. For example, previously developed shipping container systems have included attempts to attach marks, markers, bugs, radios, GPS equipment, and other devices to shipping containers. However, such systems are flawed in that reading or detecting devices for such markers are often blocked by other objects (e.g., stacked containers) between the container and the reading or detecting device, or for some reason are not accessible. Device incompatibilities also are common because there is no standardization of such devices.

Commodity goods (e.g., nuts, fruits, vegetables, etc.) are typically loosely tracked in lots in the storage and sorting process. Commodity goods are often warehoused in containers (e.g., agricultural bins) and these bins typically are not individually or precisely marked. Consequently, commodity goods from various sources can be intermingled as the storage containers are moved around a warehouse environment. Also, commodity goods are typically sorted by quality and other characteristics, resulting in sorting the containers of goods from different sources into a grouping or lot having a particular common characteristic or set of characteristics. As a result, the individual containers can easily lose their provenance, making it difficult to identify the source of the goods in the containers.

Even if such commodity containers are individually marked, warehousing operations generally do not bother with maintaining precise records and segregation of such containers due to the inefficiency and logistical difficulty of doing so. Once the individual containers are intermingled, the source information for the commodity goods therein is effectively lost. Commodity warehousing and sorting operations do not identify the source of the intermingled containers because it is highly labor intensive and inefficient.

Additionally, goods which are the subject of recalls due to manufacturing or design error or other defect are difficult to trace within a warehouse or other storage situation. Improved tracking systems for such goods are needed as well.

Further, current systems are not designed to track a particular commodity from its source, through intervening storage and sorting locations, all the way to the end user of the product. Such tracking would be useful to both a retailer and the consumer, as well as government agencies tasked with regulating trade of such goods. Agricultural goods can be subject to recalls for contamination and other reasons, and often the recall affects any and all of the goods coming from a supplier in a given date range, requiring all of the supplier's goods to be removed from the market. For example, if there is a bacterial contamination of a particular kind of fruit delivered from a supplier (e.g., a broker or distributor) who receives the fruit from multiple farms, without a system for reliably tracking and segregating the fruit sourced from various farms through the broker and to the final destination where the contamination is discovered, all such fruit that were supplied to the market through the broker or distributor would be recalled indiscriminately. This is a hugely inefficient process that results in massive waste and losses for the supplier and the farms. Systems that facilitate the tracking of commodity goods from the source through the sorting, warehousing, and packaging stages, and to the final wholesale or retail destinations are needed.

Therefore, improved, efficient, and reliable systems for tracking and retrieving individual containers or objects within a storage environment are needed. Such improved systems would facilitate tracking of goods with particularity from source to destination.

SUMMARY OF THE INVENTION

The present invention provides systems and methods for tracking items (e.g., commodities, goods, containers, boxes, packages, etc.) through transportations to multiple locations within a pre-defined space, to allow the position(s) and movement(s) of such items to be accurately tracked and documented, and to allow such items to be quickly identified and located based on tracking records kept within the tracking system. The system may utilize image sensors, image recognition and processes software, position translation software, and a virtual model of the pre-defined space in order to track objects within the defined space and maintain a record of the movement(s) and position(s) of the object within the pre-defined space.

The tracking system of the present invention may track all movements of containers or objects received and stored by the operator of the tracking system. The tracking system may include electronic devices and software operable to execute an automated process for tracking the movement and positions of the containers or objects, such that the tracking system may have a complete or substantially complete history of the movement and locations of the containers or objects that may be recorded in a centralized database. The containers or objects may be moved and positioned in the pre-defined space by manned and/or automated transport vehicles. The transport vehicles may be outfitted with a mobile computing device having one or more image sensors. The tracking system may utilize machine-readable optical markers within the pre-defined space that are used by the automated tracking process to determine the position, orientation, and other movement data of transport vehicles and objects or containers within the pre-defined space. The tracking system may also incorporate other mobile computing devices (e.g., handheld mobile electronic devices) having one or more image sensors for capturing images of the machine-readable optical markers.

The tracking system may utilize image recognition and processing software capable of identifying the machine-readable optical markers in digital images captured by the image sensors of the mobile computing devices. The image recognition and processing software may be stored in computer-readable storage of an image processing host, and the software may be implemented as executable instructions. The image recognition and processing software may calculate the position of the mobile computing device within the pre-defined space by utilizing the machine-readable optical marker(s) having known positions and dimensions. The image recognition and processing software may use pose estimation calculations to interpret the perceived image of the marker and determine the position relative to a mobile computing device. The image recognition and processing software may then interpret the matrix coding on the optical marker to identify the particular optical marker and determine its real world position in the pre-defined space. Each of the machine-readable optical markers may have a unique code (e.g., a 2-dimensional code) that identifies the particular marker and its location within the defined space. In some embodiments, the calculations for the location of the mobile computing device may take into account additional data available to the system, such as GPS data, additional machine-readable optical marker data, and/or gyroscopic orientation data collected by the mobile computing device.

The image processing host may also include position translation software stored in its computer-readable storage, which is operable to translate the real world position of an object or container in the pre-defined space into a position within a digital model of the pre-defined space. The computer-generated model of the pre-defined space may be a two-dimensional (e.g., a two-dimensional map of the floor space of the pre-defined space) or a three-dimensional virtual model of the pre-defined space. In such embodiments, and without limitation, the tracking system may also incorporate data into the digital model regarding physical structures in the pre-defined space (e.g., vertical beams, walls, doorways, ramps, elevation changes, shelving and storage structures, low clearance areas, and other physical features), such that the computer-generated model is as close a copy to the actual pre-defined space as possible. The computer-generated model may be stored in a computer-readable storage of the tracking system and may be accessible to an image processing host (e.g., a mobile computing device). For example, the computer-generated model may be stored in computer-readable memory of mobile computing devices integrated into the tracking system and/or a central computer or server with which all mobile computing devices in the tracking system are connected. The image processing host may utilize the position translation software to generate and record virtual copies of each of the containers or objects with a virtual location within the computer-generated model that accurately reflects the real-world location of the container or object in the pre-defined space. In the case of a two-dimensional map, the virtual location of the object or container may include a "pin-point" location within the map, identifying its x-y location, and additional data may be stored in the database record for the object or container regarding (1) whether the object or container is found in a stack of objects or containers and its position in that stack, (2) the height of the position of the container, (3) whether the container is positioned on a structure (e.g., a rack or scaffolding), and other pertinent data. The additional data may assist in locating the object or container in a densely packed area of the pre-defined space. In the case of a three-dimensional virtual model of the pre-defined space, the objects or containers may themselves have virtual models (including their height, width, and depth dimensions) that are stored within the virtual model, such that the x, y, and z location of the objects or containers within the pre-defined space are known.

The image processing host may be a mobile computing device on which the image recognition and processing software and the position translation software are stored. The mobile computing device may include a user interface (e.g., a touchscreen), at least one image sensor, a processing unit (e.g., a microprocessor), an operating system, computer readable memory, a wireless communication device (e.g., a radio frequency (RF) capable device) to enable wireless communication with other wireless-enabled electronic devices, and other components. The processing unit may be operable to execute the image recognition and processing software, the position translation software, and other software stored in the computer readable memory of the mobile computing device.

The tracking system may include a plurality of mobile computing devices that are each operable to function as image processing hosts and share the data it generates with the other mobile computing devices through a network hosted by the tracking system. One or more databases may be stored in the memory of each mobile computing device, including a database providing the locations and unique code data for each machine-readable optical marker utilized in the tracking system; the computer-generated model of the pre-defined space; data regarding the position of each container or object within the pre-defined space; data regarding the contents, source, date of first storage, and other relevant information regarding the objects or containers stored in the pre-defined space; and data regarding identification and authentication information for the mobile computing device for interacting with other mobile computing devices and components of the tracking system. Data generated by a mobile computing device regarding a particular object or container within the pre-defined space may be immediately shared with the other mobile computing devices through a network node. The network node may be a general purpose computer or server that includes a user interface (e.g., a touchscreen, or a keyboard, mouse and monitor, etc.), a processing unit (e.g., a microprocessor), an operating system, computer readable memory, a wireless communication device (e.g., a radio frequency (RF) capable device) to enable wireless communication with the mobile computing devices and other wireless-enabled electronic devices, and other components. The network node may be programmed with network hosting software for receiving wireless data from mobile computing devices within the network of the tracking system. The network hosting software on the network node may be operable to identify and authenticate each of the mobile computing devices in the tracking system using identification numbers and/or authentication keys assigned to each mobile computing device included in the tracking system. The mobile computing devices may be operable to transmit and receive data from the network node via radio channel, WiFi, Bluetooth, WLAN, WiMax, 3G/4G cellular radios, and/or other wireless data communication connections.

The network node may also include databases (e.g., back-up or master centralized database) that mirror the one or more databases of the mobile computing devices, including a database providing the locations and unique code data for each machine-readable optical marker utilized in the tracking system; the computer-generated model of the pre-defined space; data regarding the position of each container or object within the pre-defined space; data regarding the contents, source, date of first storage, and other relevant information regarding the objects or containers stored in the pre-defined space; and identification and authentication information for the mobile computing devices for interacting with other mobile computing devices and components of the tracking system. The databases stored on the network node may allow for loading data onto a mobile computing device to be added to the network (or a mobile computing device that has crashed), and provide a backup for data security.

In alternative embodiments, the network node may act as the image processing host. In such embodiments, the mobile computing device may simply capture optical image data from the cameras regarding nearby machine-readable optical markers and optionally other data captured by the mobile computing device such as GPS satellite navigation receiver solutions, inertial navigation data, etc., and transmit the images and other data to the network node. The network node may be programmed with the image recognition and processing software and the position translation software, and may execute these programs to determine the position, orientation, and other movement data for transport vehicles or other mobile computing devices and the objects or containers within the pre-defined space. The data output resulting from the execution of the software may then be stored in the databases on the memory of the network node.

The machine-readable optical markers of the tracking system may include optical markers placed in a static position within the pre-defined space (static markers) and markers positioned on movable objects and/or containers stored within the pre-defined space (object markers). The static markers serve as spatial reference points and may be located at various static points within the pre-defined space. In some embodiments, and without limitation, the markers may be located on the ceiling or other elevated areas to avoid or reduce obstruction of the markers by other objects in the defined space, such as stacked containers, large vertical objects (e.g., large vertical posts or pillars) shelving, and other potential obstructive objects. The system may also include static markers in other locations, such as on lower portions of pillars that may line or be in proximity to pathways through the pre-defined space, on floor surfaces along pathways through the pre-defined space, and other useful locations that may allow for unobstructed views of the static markers.

The object markers may provide dual functions, (1) giving each object or container an individual identification marker, allowing an image processing host to identify the objects or containers and their position within the pre-defined space, and (2) providing additional reference points in the pre-defined space to allow an image processing host to determine its position within the pre-defined space. With regard to function (1), the position of the objects and/or containers in the pre-defined space may be recorded and saved in the tracking system database when they are brought into the pre-defined space. The object markers may be identified by a mobile computing device positioned on a manned or automated transport vehicle (e.g., forklift) that transports the object or container into the pre-defined space, or after the object or container has been stored in the pre-defined space. For example, a human operator may use a mobile computing device to scan the object marker of an object or container after it has been placed in a storage area within the pre-defined space. Once an object marker is identified and the storage location for the object or container is reached, the position of the particular object or container may be recorded in tracking system database. Once an object or container is identified and its position is recorded in the tracking system database, the object marker on the object or container may be used by mobile computing devices moving through the pre-defined space as a reference point (in addition to the static markers) to help identify the location of the mobile computing device, since the position of the object or container is known by the tracking system. The image processing host may also identify, verify, and update the position of an individual object or container within the pre-defined space as the image processing host moves through the pre-defined space. For example, a user may be moving through the pre-defined space with a mobile computing device to identify and record positions of objects or containers that have been recently moved into the pre-defined space. Also, the mobile computing device may capture images of object markers of containers and objects already present in the pre-defined space, and the image processing host may identify the position of the object marker and its position and compare its position with the position data stored in the tracking system database. If the position is consistent with the database record, the record is verified, if the position differs from the database record, the database record will be updated.

The coding for the machine-readable optical markers may be specifically sized and designed to be perceivable to a digital camera or other image sensor at distance. For example, the marker coding may be a 2-dimensional matrix code having sufficient size to be perceived with sufficient resolution to be accurately read by the optical receiver at distance in a range of up to about 100 feet (e.g., at a distance of about 10 feet to about 100 feet, at a distance of about 10 feet to about 75 feet, at a distance of about 10 feet to about 50 feet, or at a distance of about 10 feet to about 30 feet). The size and design of the coding on the marker may allow the optical receivers of the system to perceive and sufficiently identify the data on the markers when they are positioned on the ceiling, other elevated or distant structures within the defined space, or otherwise at distance, and they are oriented at oblique angles relative to an image sensor. Such markers may allow the system to work within an environment that includes barriers and obstacles on the floor thereof, and stacked and positioned above the floor level such as a warehouse having many large stacks of containers that could interfere with RFID and other conventional tracking systems. In large environments, QR codes cannot be used due to the size and design of QR codes, which cannot be effectively read by standard image sensors (e.g., a camera of a mobile phone or tablet) at distances of more than about 5 feet. Additionally, the size and design of QR codes make them ineffective for interpreting the pose of the marker at such distances.

The matrix code may have a minimum size to allow image sensors of the tracking system to accurately capture the coding present on the optical marker. The optical markers may have various designs, but must be in a machine-readable form and must be designed such that the tracking system is able to determine the pose and orientation of the machine-readable markers based on the image of the markers captured by the image sensors of the mobile computing devices from a multitude of different positions within the pre-defined space. In some examples, the coding section of the marker may have an area of at least 20 in.$^2$. The tracking system may use various kinds of matrix codes on the optical markers, e.g., ECC 200, or customized matrix code formats. In some embodiments, the matrix code may have a rectangular shape (e.g., square or substantially square shape). The matrix code may include unique geometric features in the coding of the marker, such as a designated orientation guide (e.g., a designated section of the matrix code in a corner and/or other position within the matrix code), a data section having a machine-recognizable pattern, quiet zones within the matrix code (e.g., zones that are a single color with no variation that frame coding areas within the matrix code) and one or more other features that aid in allowing the tracking system to identify the optical marker (e.g., a border in high contrast to the background of the optical marker).

The number of cells in the matrix code may be limited for purposes of resolution and image recognition, and for efficient computing. The pre-defined space may be a large warehouse that may have space sufficient to house up to hundreds of thousands of containers and/or objects. Thus, bit number of the matrix code must be sufficient to accommodate hundreds of thousands of containers. There are also the countervailing concerns of (1) keeping the size of the cells within the matrix code sufficiently large to have sufficient resolution for identification at large distances and oblique angles relative to the image sensor, and (2) the number of calculations that must be performed in order to identify the particular matrix code—multiple matrix codes may be processed simultaneously and feedback data (e.g., about the location of a transport vehicle, such as a forklift based on the captured images of the matrix codes in the area of the forklift) must be provided quickly in real time as a transport vehicle (e.g., a forklift) is in motion. Thus, it is advantageous to keep the bit number of the matrix codes relatively low.

In some embodiments, the static markers and object markers may have different matrix code designs. For example, the static markers may utilize a matrix code of 100 bits or less (e.g., 36 bits or less) to allow for relatively large cells in order to allow for readability at distance, while the object markers may include a matrix code of greater than 100 bits to allow for a greater number of possible unique codes, thereby allowing the tracking system to track a larger number of objects and/or containers. In such embodiments, the tracking system may segregate the location analysis for determining the position of a mobile computing device within the pre-defined space from the process of identifying and recording the position of the objects or containers. In such embodiments, the lower bit number matrix codes (100 bits or less) may be used for the static markers, and higher bit number matrix codes (greater than 100 bits) may be used for the object markers. The use of the lower bit number matrix codes for the static markers may facilitate easier reading and tracking of the location and movement of a mobile computing device within the pre-defined space.

The Hamming distance of the matrix codes may also be utilized to improve the identification of the individual matrix codes on the optical markers. The matrix codes are to be read at significant distances and at various skews and angles. Therefore, the image recognition software of the tracking system may make intermittent errors in interpreting the matrix codes, resulting in bit flips that corrupt the interpretation of the matrix code. To provide a correction means for such errors, the matrix codes may have Hamming distances sufficient to correct errors in reading the matrix codes. Each of the matrix codes may be sufficiently different from the other matrix codes in the tracking system such that a small number of errors made by the image recognition software in reading a matrix code will not result in misidentifying the matrix code. The matrix codes may be 128 bits or less (e.g., 36 bits) and may have a Hamming distance in a range of 6 to 20. These limitations on the possible unique codes can be adjusted to optimize readability of the matrix codes based on the maximum distance at which they would be read. For example, larger maximum distances (e.g., for static matrix codes) would call for a lower number of bits (e.g., 12-24 bits) and a Hamming distance of about 6 to 12. Higher bit numbers and Hamming distances may be used for the object matrix codes, to allow for a higher number of matrix codes to accommodate more containers or objects. In one example, the object marker code may be 63 bits, 24 of which store data, with a minimum Hamming distance of 15, which provides $2^{24}$ unique object markers with a matrix code to be at least 15 bits away from the matrix code of any other object marker and allows correction of up to 7 bit flips by the image recognition software.

The machine-readable optical markers may be constructed from any material on which the coding may be directly printed or otherwise applied. The machine-readable optical markers may be mechanically sturdy such that the machine-readable optical marker does not physically breakdown and the coding data thereon is not compromised by deterioration. Various materials may be used for the markers, such as sealed paperboard, plastic sheeting, cardboard, metal, and other common materials. The material may be opaque and the color may be in high contrast to the color of the coding to be printed or applied to the machine-readable optical marker, such that the coding may be easily read by an image sensor. In some examples, the applied coding may be on a retro-reflective material to improve the contrast of the coding and thus the signal-to-noise ratio and the quality of the signal output from the image sensor. In other examples, the machine-readable optical markers can be imprinted directly on planar or substantially planar structures within the pre-defined space (e.g., ceilings, walls, pillars, beams, etc.) using stenciling and/or other methods.

In some embodiments, data may also be printed in human language on the static markers (e.g., outside of the boundary of the matrix code). Such human language data may include identification codes, coordinate/location data, and other information. This printed text may allow a human operator to determine an approximate location within the pre-defined space by simply viewing and reading the text on the nearest static marker.

The image sensors used to capture the images of the optical markers may be digital cameras suitable for symbol imaging purposes having a light sensitive image sensing array of the CCD, CMOS or other available and suitable type. The image sensors are connected to and in electronic communication with the mobile computing device(s). For example, the image sensors may be built-in cameras on the mobile computing devices (e.g., smartphones, tablets, or onboard computers in the vehicles for transporting the objects or containers). In some embodiments, the image sensors may be mounted on a transport vehicle (e.g., a forklift) and may be mounted such that it faces in an upward direction to locate the positions of the static markers (e.g., on a ceiling, upper wall area, or other elevated structure of a defined space). In some embodiments, the vehicles may be automated, and may include cameras facing forward, back, left, and right to monitor the surroundings, and provide enough image data to track the movement of the vehicle in real-time without significant processing delays.

In some embodiments, the tracking system may include a plurality of image sensors combined in an array of image sensors arranged such that they cover a hemispheric or substantially hemispheric view of the pre-defined space. In such embodiments, the mounting point of each image sensor on a vehicle and the orientation of each image sensor (e.g., the angle of the image sensor's focal axis relative to the mounting point on the vehicle) may be known and encoded into image recognition and processing software of the tracking system. The orientation of each image sensor relative to the vehicle is thus encoded and known, and therefore the relative position of the optical markers in the images captured by the image sensors can be calculated. In such embodiments, the image sensor array may capture images of both static markers and object markers, and the image recognition and processing software may analyze the captured images of both the static and object markers in determining the position of the vehicle. The image recognition and processing software may also identify the position of the object markers in the pre-defined space to verify or update the position of objects or containers associated with the object markers in the tracking system database, as discussed above.

Vehicles incorporated into the tracking system may also have one or more image sensors facing in forward and/or lateral directions in order to read the object markers on the objects and/or containers in the pre-defined space. Additional image sensors may be provided facing upward, facing in each lateral direction, and/or facing behind the transport vehicle to improve tracking by capturing more optical marker data for use in the image recognition and processing software's calculation of the vehicle's position, thereby improving accuracy.

The data in the optical markers captured by the image sensors may be used by the image processing host to determine the position of a vehicle or person based on the orientation and known location of the static marker(s) and/or the object marker(s) as perceived by the image sensors. More specifically, the image recognition and processing software analyzes an image for the presence of optical markers therein, analyzes the orientation of the optical marker relative to the mobile computing device that captured the image, identifies the data provided on such optical markers and identifies the real-world location of the marker based on the data, calculates the location of a mobile computing device relative to the machine-readable optical markers based on the real-world location of the optical markers, and translates that relative location to a defined real-world location within the pre-defined space. The position translation software is operable to translate the real-world location of the mobile computing device into a virtual location within a computer-generated model (e.g., 2D or 3D virtual model) of the pre-defined space stored in a memory of the tracking system. Once the real-world position of the mobile computing device is translated to a corresponding position in the computer-generated model of the pre-defined space, the position of the mobile computing device can be recorded in a memory of the tracking system. The movement of the mobile computing device through the pre-defined space may then be tracked through the pre-defined space in real time. The tracking system can thus provide real-time and continuous tracking of objects and/or containers within the pre-defined space (e.g., a warehouse or other location having containers or objects stored therein) through the automated image recognition and analysis and position translation methods.

The real-time continuous tracking may also facilitate the automated, unmanned operation of transport vehicle. With a computer-generated virtual model of the pre-defined space that includes representations of the containers and objects and the other physical structures (e.g., vertical posts, pillars, shelving, and other potential obstructive objects) within the pre-defined space, the routes of the automated vehicles may be determined by navigation process software (described below) and the automated vehicle may be directed to move to a location, pick up one or more objects or containers, and move the objects or containers to a second location by the navigation process software.

The image recognition and processing software and the position translation software may be loaded and stored in computer-readable storage of an image processing host and implemented as executable instructions. The image recognition and processing software may adjust captured images for readability, determine the presence or absence of one or more machine-readable optical markers in a captured image (based on marker shape and reference and coding features), and analyze the matrix code on the optical markers. Machine-readable optical markers detected in a captured image are first identified as optical markers, the image thereof is then adjusted and optimized for readability and orientation through a pose estimation process. Each image of an optical marker is then analyzed for the identity of the machine-readable optical marker to allow the image recognition and processing software to either determine the location of the optical markers by looking up the corresponding pre-determined location of the optical marker stored in a memory of the image processing host (in some embodiments, the matrix code will provide an identification code within the matrix code that allows the image processing host to look up the physical position of the optical marker based on the identification code), or from data encoded in the matrix code of the optical marker (in some embodiments the physical location will be encoded into the matrix code). The relative position of the optical marker to the image sensor can then be determined based on the orientation and known location of the optical marker in the pre-defined space.

The optical marker may first be identified as an optical marker by virtue of one or more features that aid in allowing the image recognition software to identify the optical marker. For example, the optical maker may include a border in high contrast to the background of the optical marker that defines the machine-readable area and the length and width of the matrix code. Once the optical marker has been identified as an optical marker, the image recognition and processing software may identify a designated orientation guide, such as a section of the matrix code in a corner (e.g., an upper left corner) and/or other pre-determined position within the matrix code that is asymmetric with respect to both left to right (x axis) and top to bottom (y axis) of the optical marker to allow the image recognition and processing software to identify the orientation of the optical marker relative to the image sensor that captured the image.

Once the orientation guide has been identified, the image recognition and processing software may perform a pose estimation operation to identify the manner in which the image of the optical marker is rotated and/or twisted in the image due to the relative orientation of the optical marker to the image sensor. Since the geometry (size and shape) of the optical marker is known, and the pose can be determined based on the position of the orientation guide within the captured image of the optical marker, the data contained within the rotated and/or twisted image of the optical marker can be digitally interpreted by a pose estimation process. The pose estimation process may utilize a set of control points on the object, such as the corners of the high contrast border and the orientation marker, and a set of calculations to translate the perceived 2-dimensional code pattern to correspond to points of a two-dimensional plan view image of the optical marker. The pose estimation counters the estimated rotation and twist in the perceived 2-dimensional code pattern in the captured image to generate an estimated and optimized plan view of the optical marker. The following diagram illustrates the pose estimation process.

The pose estimation process compares the known size and shape of a matrix code with the projected image of the matrix code in order to get an accurate estimate of that objects pose with respect to the imaging sensor. The image recognition and processing software transforms the perceived pose of the matrix code to a plan view that matches the known image of the matrix code by calculating the rotation and translation vectors required to match the perceived image to the known plan view image of the matrix code. These rotation and translation vector values can then be inverted in order to find the pose of the camera relative to the object as well. The pose estimation process performed by the image recognition and processing software includes the following steps:

1. Identify the object in the image as an optical marker by one or more features that aid in allowing the image recognition software to identify the optical marker (e.g., a high contrast border, the orientation guide, the checkered pattern of the matrix code, etc.);
2. Identify the orientation of the optical marker in the image by locating and orienting the orientation guide, and find the known set of control points in the image (e.g., the corners of the matrix code);
3. Compare the differences between the control points of the optical marker in the image and the control points as they are presented in the stored image of the matrix code in order to produce two vectors, the translation and rotation vectors.
4. Transform the skewed and rotated image of the optical marker using the translation and rotation vectors to create a transformed image of the perceived optical marker, an optimized plan view that matches the orientation of the stored image of the matrix code.

A visual representation of the transformation using the translation and rotation vectors is provided in FIG. 8 using control points 1-4.

The pose estimation process can also provide a close estimate of the distance of the optical marker from the image sensor by comparing the size of the transformed optimized plan view of the optical marker and the known size of the optical markers of the tracking system. The size ratio between the optimized plan view and the known size of the optical markers can be used in a subsequent process of calculating the real world position of the image sensor, as discussed below. In some examples, the ratio of the known size of the optical marker to the number of pixels occupied by the marker may provide an approximate measure of the distance between the image sensor and the optical marker based on a pre-determined table of ratios of pixel number to distance.

The identity of the optical marker can be determined by analyzing the data provided in the matrix code. The image recognition and processing software may be programmed to recognize the broken columns and rows of the matrix code in the data section, which may be a pre-determined number of "cells" that may be filled with a dark color (e.g., black) or a light color (e.g., white). Each matrix code may have a unique pattern of dark and light cells within the matrix code, allowing each optical marker to be uniquely identified. Data encoding is accomplished by assigning dark cells to represent binary "1" and light cells to represent binary "0", or vice versa. Contrasting colors other than black and white may also be utilized as long as the imaging device and computer software can differentiate between light and dark cells. Once identified and located within the captured image, the optical marker coding is analyzed and the position of the particular optical marker is identified from the coding that may include the real-world positions of each machine-readable optical marker within the pre-defined space.

In some embodiments, the identity of the optical marker can be determined by comparing the unique matrix code of the perceived optical marker to corresponding points of digital models of the known two-dimensional code patterns of the optical markers (static or object markers) that are present in the pre-defined space. The digital models of the optical markers may be stored (e.g., as a look up table) in a memory of the image recognition and processing host and may be available for retrieval and comparison to the estimated and optimized plan view of the optical marker captured in the digital image. The comparison of the estimated and optimized plan view of the perceived optical marker to the stored digital models allows the image recognition and processing software to identify the perceived optical marker by matching the coding in the data section of the perceived marker and/or one or more other features that aid in allowing for effective comparison of the optical marker to the stored models. In some embodiments, the matrix code of static markers may include real-world coordinates for its position within the pre-defined space. In such embodiments, the real-world position of the static marker may be determined by the image recognition and processing software by interpreting the matrix code data without reference to a database.

Once the real-world location of the optical marker is identified, and the orientation of the marker relative to the image sensor is known, the image recognition and processing software may transform the positions of the image sensor and the optical marker to treat the optical marker as an origin in a three-dimensional coordinate system as shown in FIG. 9.

The coordinate system may be aligned with the static marker (e.g., where the x-axis is parallel with the lateral sides of the marker, as shown in the diagram) such that the coordinate systems of two or more markers are normalized and may be coordinated with a grid pattern of static markers within the pre-defined space. The real-world position of the image sensor within the pre-defined space can be found by first estimating the pose of the image sensor with respect to the optical marker using the rotation and translation vectors previously calculated for transforming the matrix code of the optical marker. With the static marker established as the origin and point of reference, the image recognition and processing software may estimate the real world position of the image sensor within the pre-defined space using (1) a calculation relative position of the image sensor to the optical maker within the pre-defined space based on (a) the rotational and translation vectors and (b) the size of the perceived image of the optical marker, and (2) the known position of the optical marker, including the height of the optical marker's position within the pre-defined space. As a result, the image recognition and processing software provides a real-world location for the image sensor and the associated mobile computing device within the pre-defined space.

Other data may also be taken into account in calculations of the real-world position of the image sensor. For example, the identity of the image sensor that captured the image being analyzed and the associated height position of the image sensor may be encoded into the image recognition and processing software and taken into account in the calculations for determining the real world position of the image sensor, thereby providing a more accurate calculation.

The following steps provide an exemplary process for determining the location of the mobile computing device within the pre-defined space:

a. The image recognition and processing software analyzes the image data captured by an image sensor for the presence of optical markers (static markers and/or object markers) and identifies optical markers present in the image data in sufficient resolution;

b. The image recognition and processing software analyzes features in the matrix code of the optical markers identified in the image data to determine the orientation of the optical markers relative to the image sensor through the pose estimation process;

c. The image recognition and processing software determines the real-world position of the optical markers within the pre-defined space based on the data provided in the matrix code;

d. The image recognition and processing software determines the real world position of the mobile computing device in the pre-defined space by:

1. Transforming the positions of the mobile computing device and the optical marker, such that position of the optical marker is used as an origin of a three-dimensional coordinate system, and 2. Calculating the position and orientation of the mobile computing device within the pre-defined space based on the known position of the optical marker (including a known height), the rotation and translation vectors, an estimated distance between the optical marker and the mobile computing device based on the number of pixels occupied by the optical marker in the captured image, and other data (e.g., a known or estimated height of the mobile computing device, etc.), 3. In some implementations, step 2 is repeated for each of the optical markers in the captured images to provide multiple calculations of the real-world position of the mobile computing device, which may then be averaged by the image recognition and processing software to provide a precise estimate of the location.

The real world position data output from the image recognition and processing software may then be used by position translation software to translate the position and orientation of the image sensor and the mobile computing device to a position within the digital model of the pre-defined space stored in a memory of the image processing host, thereby locating a virtual copy of the vehicle or mobile computing device from which the image was captured within the computer-generated model of the pre-defined space.

Additionally, multiple position markers may be within the captured image, including static markers and/or object markers. The steps of identifying the location of the particular machine-readable optical marker, and the relative position, distance, and orientation of the optical marker may be performed for each optical marker identified in the captured image. The output data resulting from the identification, pose estimation, and transformation calculations for each marker may then be utilized to refine the estimate of the position of the image sensor through an averaging calculation, plane geometry (e.g., taking into account two optical markers and the their respective distances from the image sensor), or other techniques.

Once the position of the mobile computing device is translated into a virtual position within a computer-generated model (a 2 dimensional or 3 dimensional map) of the pre-defined space (e.g., as within a virtual environment), the movement of the mobile computing device can be accurately tracked and recorded in a seamless real-time manner by the tracking system. The image recognition and location analysis routines may be repeated to track the movement of the vehicle or mobile computing device through the pre-defined space and create a digital record of such movement. The image sensor(s) of the mobile computing device may continuously or at intervals (e.g., at an interval length in a range of about 0.01 to about 1 second) capture and send images of optical markers in the defined space to the image processing host, which performs the following steps each time it receives a new image: (1) identifying the optical markers in each image, (2) analyzing the matrix code data within the optical marker to calculate the pose estimation and identify the particular marker location within the pre-defined space, (3) transforming the positions of the image sensor and the optical marker to treat the known position of the optical marker as the origin and determine the real world location of the image sensor, (4) translating the actual physical position of the mobile computing device to a virtual position within the computer-generated model, and (5) recording the position within the computer-generated model in a memory of the image processing host. In this manner, the movement of a mobile computing device through the pre-defined space can be tracked and recorded with precision.

The ability to track mobile computing devices (and vehicles with which they may be paired) allows the tracking system to track and record the movement and position of containers and objects that are moved through the pre-defined space. A container or object may be identified by a unique identification number that is encoded into the matrix code of the object marker attached to the container or object. In alternative embodiments, the container may include a simple identification means, such as a bar code. The movement and location of the container or object may be tracked by (1) first identifying the container or object by manual input of the identification code and/or scanning or capturing an image of the matrix code to allow the image processing host to identify the specific container or object, (2) moving the container or object through the pre-defined space in conjunction with a mobile computing device (e.g., on a transport vehicles or other tool equipped with such a mobile computing device), and (3) tracking the movement and location of the mobile computing device through the pre-defined space and recording such movement and location in a memory of the image processing host. The movement and position data of the mobile computing device may be recorded as the movement and position of the associated container or object that was moved in conjunction with the mobile computing device. Once the container or object reaches its destination (e.g., a storage location in a warehouse), the image processing host may record such location as "stored position" for the particular container or object in a memory.

The system may also be able to monitor and track the positions of containers that are already within the pre-defined space. The object markers of many of the objects or containers within the pre-defined space may be perceivable by the image sensor(s) of a mobile computing device present in the pre-defined space, whether they be mounted on a vehicle or carried by a person. In some examples, objects or containers may be moved into the pre-defined space with a vehicle or other device or means that does not include a mobile computing device. In such examples, a human operator may use a mobile computing device incorporated into the tracking system to identify the objects or containers after they have been positioned and stored in the pre-defined space. The mobile computing device may be used to deliberately capture images of the object markers on the objects or containers, identify their real-world locations within the pre-defined space, translate their positions into virtual positions within the computer-generated model of the pre-defined space, and record the positions in the tracking system database.

Also, mobile computing devices moving through the pre-defined space may capture images and the image recognition and processing software may identify any markers that are captured within the image, including any unobscured object markers present in the image in sufficient resolution. The image recognition and processing software and the position translation software may then process the data from the marker image and calculate the position of the objects or containers relative to the position of the mobile computing device within the pre-defined space to (1) aid in determining the current position of the mobile computing device, and/or (2) provide an updated position for the object or container within the pre-defined space. In such embodiments, the ability of the mobile computing devices to detect the locations of objects or containers having markers perceivable from the mobile computing device may allow for additional data in determining the position of the mobile computing device and for verification and updates of the locations of the objects and containers within the pre-defined space.

The location of objects or containers within the pre-defined space and captured in images by a mobile computing device may be determined through the following exemplary process:

a. The image sensor captures an image of an object marker on a container or object.

b. The image recognition and processing software analyzes the image data for the presence of an optical marker, locates any object markers in the image, and then analyzes the features of the matrix code data on the object marker identified in the image data to determine the orientation of the object marker relative to the mobile computing device through the pose estimation process;

c. The image recognition and processing software determines the real world position of the object marker in the pre-defined space by calculating the position and orientation of the object marker within the pre-defined space based on the known position of the mobile computing device, the rotation and translation vectors for the object marker, an estimated distance between the optical marker and the mobile computing device based on the number of pixels occupied by the optical marker in the captured image, and other data (e.g., a known or estimated height of the mobile computing device, etc.);

d. The matrix code of the object marker may include identifying information for the particular object or container that may be utilized by lookup process software to determine whether a record exists in the database of the tracking system and whether the location of the object or container has been recorded;

1. If the location has been previously recorded, the lookup process software compares the position of the object or container calculated by the image recognition and processing software to the recorded position of the object or container,
     a) If the calculated position and the recorded position match, the location is confirmed,
     b) If the calculated position and the recorded position do not match, the virtual location record of the object or container is updated in the computer-generated model of the pre-defined space;

2. If the location has not been recorded, the position translation software records a virtual location of the object or container in the computer-generated model of the pre-defined space.

The tracking system may include a database for storing records associated with each container or object received in which the location data for each object or container is stored, and a history of the movement of the object or container through the pre-defined space, e.g., time and date information correlated to all movements and positions of the particular container or object may be recorded in a database of the tracking system. The date and time data may be provided by clock and calendar software within the image processing host. The tracking system may also include additional data in the record for a given object or container, such as data regarding the material inside the container (e.g., agricultural goods, such as fruits, nuts, vegetables, etc.) or a description of the object (e.g., a television of a particular model), which may be included in the record of the container or object, allowing a human operator to determine content of the container or identity of the object. In some implementations, source data may be included in the record for the particular container or object that indicates where the container or object came from. For example, the source data may indicate the farm from which the agricultural goods (e.g., fruit, nuts, etc.) contained in a particular container came. In some implementations, data regarding a particular lot or batch of the goods in the particular container or the lot or batch of the particular object may be included in the record for the particular container or object that indicates the source of the goods and the additional data such as the time of harvesting (in the case of agricultural goods), the time of manufacture (for manufactured goods), the particularized source of the goods (e.g., a particular field and time of harvest for agricultural goods, a particular factory and the particular maker/assembler of a manufactured good, etc.), the chain of custody of the goods, the method and route of shipping of the goods, the method of handling of the goods prior to delivery of the goods to the handler using the tracking system of the present invention (e.g., temperature at which the goods were kept, whether the goods were washed, whether the goods were exposed to the elements and for how long, etc.), the quality rating of the goods (e.g., the quality, size, color, and/or other characteristics of a particular batch of a crop, such as almonds, stone fruit, etc.) and/or other data relevant to the lot or batch of the particular kind of goods. Additional forms of data may be further included in the record of the particular container or object.

The additional forms of data may be used as search parameters for a lookup process provided by the tracking system that has access to the position records for the object and containers in the pre-defined space. A human operator may search the records of the containers or objects stored in the pre-defined space using a user interface of a mobile computing device or other computing device incorporated into the tracking system to input query data into a lookup process software program provided on the mobile computing device or other computing device. The human operator may input query data including, but not limited to, the identification number of the particular container or object, the date of delivery of container(s) or object(s), the lot or batch number of container(s) or object(s), the source of container(s) or object(s), kind of goods contained in the container(s) or the kind of the object(s), the containers that correlate to a specific parameters for the goods contained in the container (e.g., almonds from a specific source, of a specific quality, and/or other criteria used to identify particular goods and the containers in which they are found) and/or other query data that is included in the record of one or more container(s) or object(s) that have been recorded in a memory of the tracking system. For example, lookup process software operable to access the container and object records stored in the memory of the tracking system may be present on the mobile computing devices.

The lookup process software may allow a human operator to locate one or more containers or objects based on chosen queries. For example, if a source of goods finds that a particular lot or batch of goods is contaminated or in some way flawed (e.g., a farm indicates that agricultural products of a particular batch are suspected to be contaminated with a pathogen), the human operator can look up all containers or objects that are included in the particular lot or batch by searching for the lot or batch number through the lookup process software. The human operator may also search records in the memory of the tracking system, e.g., based on the date containers (or goods in containers) or objects were delivered, the kind of goods in the containers or the kind of objects, the source of the containers (or goods in containers) or objects, and other data based on the specific purpose for identifying the containers (or goods in containers) or objects.

The tracking system of the present invention may also provide instructions for finding particular container(s) or object(s) that are stored in the pre-defined space. The instructions may be provided as a part of the output data provided by the lookup process software in response to a query. For example, a delivery order may be requested based on particular parameters (e.g., the date of delivery of container(s) or object(s), the lot or batch number of container(s) or object(s), the source of container(s) or object(s), kind of goods contained in the container(s) or the kind of the object(s), the quality rating of the goods, and/or other criteria used to identify particular goods and the containers in which they are found, and/or other query data that is included in the record of one or more container(s) or object(s)), and the lookup process software may use those parameter to identify specific containers and objects for which there is a record in the corresponding database. The lookup process software may provide output instructions on a display screen of a mobile computing device (e.g., carried by a human operator or installed on a transport vehicle), including a list of the data contained in the record of the particular container(s) or object(s) (e.g., the identification number(s) of the containers or objects, source data, delivery date and time data, lot or batch data, identity of goods data, etc.), and a map of the pre-defined space with one or more location identifiers (e.g., pins or points) that identify the location of the container(s) or object(s).

In some embodiments, and without limitation, the directions may be provided as a graphic display over images captured by a mobile computing device. The lookup process software may provide the human operator the option to receive directions as graphics overlaid on real-time image output provided to the screen display of the mobile computing device from an image sensor of the mobile computing device. This process provides a viewfinder display on the mobile computing device. In the case of a transport vehicle, the directions supplied to the display screen of the mobile computing device may be used to retrieve the container(s) or object(s) and transport them as desired. The identified container(s) or object(s) may be highlighted on the screen by a high-contrast outline positioned thereover on the screen of the mobile computing device (e.g., a brightly colored graphical box) that allows the user of the mobile computing device (e.g., a forklift operator) to easily identify the appropriate container(s) or object(s) in the storage area or other location in which the container(s) or object(s) are found. The selected containers may then be transferred to their next destination (e.g., a transport vehicle for delivery to a purchaser of the goods, etc.).

The lookup process software may have a subroutine that provides the images captured by the image sensor(s) of the mobile computing device to the image recognition and processing software, which identifies the optical markers in the images captured by the one or more image sensors of the mobile computing device, and determines the position and orientation (rotational orientation or heading) of the mobile computing device through the processes described herein. Once the image processing host has identified the actual position of the mobile computing device in the pre-defined space and translated the position to a virtual position within the computer-generated model of the pre-defined space, the image processing host can calculate the most efficient route to the container(s) or object(s) through a navigation processing software operable to create a route based on the virtual position of the mobile computing device and the virtual destination(s) of the container(s) or object(s).

The navigation processing software may use a point-to-point shortest path technique between the location of the mobile computing device (the starting point) and the identified container(s) or object(s) (the end point(s)) taking into account obstacles within the pre-defined space, including the virtual copies of each of the containers or objects in the pre-defined space, and other physical structures, such as vertical beams, walls, doorways, ramps, elevation changes, shelving and storage structures, low clearance areas, and other physical features) that are also incorporated into the computer-generated model, as discussed above. In such embodiments, and without limitation, once the starting and endpoints are specified, navigation processing software may then calculate one or more route options taking into account the obstacles modeled within the computer-generated model of the pre-defined space, wherein the navigation processing software is constrained to form routes that do not intersect any physical object represented in the computer-generated model, and the route must not pass between two physical objects that are separated by less than a pre-determined distance (e.g., the approximate width of a forklift) in order to allow for comfortable passage through the pre-defined space.

Once the one or more routes are calculated, the navigation processing software may be operable to select the route of the shortest distance for output to the mobile computing device as a route presented with a map on the display screen of the mobile computing device or as graphics overlaid on a real-time image output provided to the screen display of the mobile computing device from an image sensor of the mobile computing device. The navigation processing software may generate a graphical path that overlays images captured from an image sensor of the mobile computing device on display screen of the mobile computing device. The graphics may include straight, curvilinear, and bent arrows that show the direction of travel toward the container(s) or object(s). The graphics may also include outlining or other graphic indicators to identify the specifically sought container(s) or object(s) within the image displayed on the display screen of the mobile computing device. A human operator can visually follow the graphic indicators to the desired containers or objects.

The above-described lookup process for providing directions may be carried out in the same general manner to allow a human operator to identify a source, lot, or other identifying information for goods that may have been housed in a container that was or is housed in the pre-defined space. The detailed records for each container(s) or object(s) that arrives and leaves the pre-defined space and associated facilities provided by the tracking system of the present invention allow for human operators to trace handling of the container(s) (and goods therein) and object(s) without gaps in the record. Such a precise and detailed database allows, e.g., goods housed in the containers to be traced back through their routes of delivery to their ultimate source. The detailed records are highly useful in situations in which goods (e.g., agricultural goods) are found to be contaminated or otherwise faulty. The detailed records of the present tracking system may allow for more accurate identification of the source of contamination or flaw, and may thereby reduce the volume of goods that need to be recalled from the marketplace as a result of such contamination or flaw. This may significantly improve economic efficiency and reduce the costs incurred by businesses that are required to recall goods.

In such processes, the container(s) or object(s) may be moved from their stored location from which they are retrieved to a new location, such as on a truck or other transport vehicle for shipping to a new location (e.g., a customer). The container(s) or object(s) may be arranged in a pre-determined pattern on the transport vehicle that allows the markers on the container(s) and/or object(s) to be viewed by image sensors positioned around a tracking station prior to the transport vehicle leaving the location from which the container(s) and/or object(s) were retrieved. The tracking station may include one or more image sensors operable to capture images of the transport vehicle and the container(s) and/or object(s) loaded thereon. The images captured by the one or more image sensors may be analyzed by the image recognition software to locate the marker images therein and matrix codes on the markers to identify the particular location of the retrieved container(s) or object(s) may be tracked from the stored location from which it is retrieved to its new location, whether it be a new location within the pre-defined space, a different storage space, or a hauling vehicle (e.g., a train, tractor trailer, or other hauling vehicle) to allow the tracking system to have a complete record for each container(s) or object(s) that arrives and leaves the pre-defined space and associated facilities.

In some embodiments, the tracking system may include a geo-fencing functionality that prevents objects or containers from being removed from the pre-defined space if they are not scheduled to be removed. In some embodiments, the image recognition and processing software may include an exit authentication protocol that checks a scheduled exit log stored in a memory of the image processing host. The exit log may include all objects or containers designated to be transported out of the pre-defined space and the date on which they are scheduled to leave, and optionally other data, such as the vehicle or other transportation mechanism on which they are scheduled to leave, the intended recipient of the object or container, etc. In other examples, the data regarding whether an object or container is scheduled to be removed from the pre-defined space may be stored in the database record for the object or container. If a vehicle is moving an object or container that is not identified in the exit log, and the image processing host tracks the transport vehicle carrying the object or container to within a pre-determined proximity of a point of egress from the pre-defined space, the image processing host may send an alert to the mobile computing device on the transport vehicle notifying the operator of the vehicle that it is transporting one or more objects or containers that should not be removed from the pre-defined space. In the case of an automated transport vehicle, the image processing software may simply send a command to the transport vehicle to stop and/or return the objects or containers to their storage location within the pre-defined space. The tracking system may also include special image sensors near the points of egress for the pre-defined space (e.g., at an exit gate) that capture images of the object markers as they pass through the exit gate. The image sensors may be in electronic communication with an image processing host and may analyze the images of the object markers and look up the records for the object markers and check the exit log to determine whether the object or container is designated to be removed from the predetermined space. If the object or container is designated to leave, no action is taken; but, if not, the image processing host may send a signal to an alarm (e.g., flashing lights, audible sirens, and/or other devices) positioned at the exit gate and/or other positions in the pre-defined space to alert the operator moving the objects or containers that the objects or containers should not be removed from the pre-defined space.

In some embodiments, the tracking system may include a validation function operable to compare an electronic manifest to object(s) and container(s) loaded onto a transport vehicle (e.g., truck). An operator may access the database through a user portal and retrieve the electronic manifest from the database and load the manifest into the network node user interface. The user interface may be operable to display an itemized inventory list of object(s) and container(s) to verify an inbound shipment or outbound shipment. The user interface may display shipment information including the client company, the shipment ID and the total load of the haul, manifest data including the origin of the goods (e.g., farmer, field, etc.), the type of goods (e.g., fruit, vegetables, farmed goods, etc.) and destination of the shipment, and an itemized inventory list of object(s) and container(s). The inventory list includes the container identification number, an optical marker (e.g., Bin Tag), a manifest number, the total weight of the object, the weight of produce, the combined weight (e.g., Net), and the validation status of each object loaded on the transport vehicle. Further the network node may be in communication with a plurality of image sensors positioned around a predefined space, the image sensors may be configured to continuously scan the predefined space for object(s) in the itemized list. The predefined space may be, for example, a loading and unloading lane inside of a warehouse. The user interface may provide a live video feed of each image sensors in the plurality of image sensors. In some embodiments, a transportation vehicle may be equipped with an optical marker having matrix coding that contains data corresponding to the manifest of an arriving/departing shipment and an optical sensor in communication with the network node may scan the region for the a shipment. The optical sensor may be positioned outside of the predefined space and scan the inlet area into the predefined space, and when the transport vehicles optical marker is identified an inventory list corresponding to the vehicles load is sent to the user interface. In some embodiment, if multiple transport vehicles are detected in the inlet area space a queue of inventory lists may be sent to the validation software. The image sensors may be in communication with a machine vision system including image recognition and processing software that may be operable to analyze image data for unique optical markers.

In such embodiments, the image recognition software may be operable to determine the distance of a unique optical marker in the image sensors field of view using a distance transform that is useful in precomputing the distance of an object relative to the position of the image sensor and the predefined space. For objects having linear surface faces the distance calculations may utilize the Manhattan distance transform, Euclidean distance transform, and signed distance transforms to determine the distance of an object relative to the predefined space. If an object has a nonlinear surface the distance transforms may be calculated by, (1) first calculating the orthogonal distance of an optical markers using a distance from face space computation and (2) calculating the distance along the plane of the nonlinear surface using a distance in face space computation, the two computations are utilized as parameters in the linear surface face distance calculation to determine the distance of an object marker relative to the predefined space. The relative distance of one object to another object each unique optical marker in the cameras field of view may be calculated to determine the relative distance of one object from another object, using the Manhattan, Euclidean, and signed distance transforms. If the distance of an object recognized by the image recognition software exceeds a threshold defined by the predefined area or geofenced region the objects optical marker is removed from the dataset sent to the processing software for analysis. When an optical marker is identified by the recognition software and within the predefined space the processing software may determine the orientation of the optical marker using Euclidean, affine, projective, and pose estimation transforms to determine the translation and rotation of the optical markers with respect to the image sensor. The processing software may identify the optical markers identification code and the data corresponding to the code may be loaded into the network node from the database for comparison with the manifest data to determine if the object is a match (e.g., validated), unmatched (e.g., review), or unknown. The user interface object status for a matching object may be changed to validated, an unmatched object is flagged for review and the data set for the unknown object is added to the inventory list on the user interface, and an unknown object may be flagged as unknown and added to the inventory list as a blank entry. If an object(s) is flagged for manual review a user may manually validate the object(s) in the user interface and change the status to validated.

If an object is identified by the recognition software in the predefined space, an identification marker may be superimposed over the object marker in the video feed using. The identification marker may include the container identification number or other data corresponding data retrieved from the node database for the identified object. The network node may utilize the computed orientation, translation, and rotation from the image processing software to project the identification marker over the object marker in the video feed. The recognized object may be continuously tracked by the software and the position transform may be recalculated on an intermittent basis and the identification marker may be updated in the video feed. The status of the object may be projected onto the object with the identification marker. In other embodiments, the object/container dimensions in the three-dimensional database may be retrieved and the identification marker may be scaled to match the size of the object in the image sensors field of view. An unrecognized optical marker may be flagged with an identification marker in the video feed for identifying the object for manual review from an operator.

In such embodiments, the plurality of objects in the predefined space may be tracked and an itemized inventory list on a user interface of a server computer may be verified for an inbound or outbound shipment, the method comprising: placing a unique object marker on each of a plurality of objects loaded onto a transport vehicle, each unique object marker having a machine-readable code corresponding to a record in a database on the server computer that includes identification data and data regarding the object on which it is positioned; placing a plurality of image acquisition devices at predetermined location in the predefined space, each image acquisition device in communication with image recognition and processing software on the machine-readable memory of the server computer and displaying a video feed of an acquired image on the user interface; loading the itemized inventory list into the user interface, the itemized inventory list including a validation status, an identification number, and the goods for each item in the inventory list; analyze the acquired images with the image processing software to identify if a unique object marker is present in the image acquisition devices field of view; retrieve object identification data from the unique object markers within the predefined space and determine if the identification data of the object matches an item in said inventory list; and changing the validation status of the item to validated based on the determine if the identification data of the object matches an item in the inventory list. Wherein the video feed of the predefined space is a stream of captured images continuously analyzed by the image recognition and processing software as described herein for unique object markers and object data corresponding to the unique object marker retrieved from the database and compared to the inventory list until each of the items in the inventory list is validated on the user interface and the outbound or inbound shipment is validated. The method may further comprise: generating a unique identification marker with the processing software, the identification marker having the validation status, identification number of a detected unique object marker in the predefined space; superimposing the identification marker over the unique object marker in the video feed based on the distance, position, and orientation calculation; and tracking the unique object marker in the video feed and modifying the superimposing of the identification marker based on new distance, position, and orientation calculations.

In such embodiments, when determining if the identification data of found object matches an item in the inventory list fails to match an item in the list the object may be flagged for review with an invalid identification marker superimposed over the unique object marker and may be added to the inventory list as an object requiring review from an operator. The system may further comprise an image acquisition device positioned outside of the predefined space and may be operable to identify a machine-readable optical marker positioned on the transportation vehicles. The transport vehicles machine-readable optical marker may correspond to an inventory list in the computer database and may be operable to initiate a loading function that uploads the inventory list to the user interface. The itemized inventory list includes shipment data, including the producer of goods, a transport vehicle, a transport vehicle weight, a transport vehicle operator, and a total weight of the vehicle with the load. The itemized inventory list may include item data including a bin tag, a weight of goods, a weight of the container, a total weight of the item, and the objects manifest. Each of the image acquisition devices further comprising a machine vision system that includes an image sensor and image capture electronics, for acquiring images of the predefined space for processing in the image recognition and processing software. The user interface may include a toggle corresponding to each item in the inventory list for an operator to verify that the object is on the transportation vehicle manually. The distance, positioned, and orientation may be determined by the image recognition and processing software using pose estimation, Euclidean, affine, projective, and signed distance transforms.

In some embodiments, transport vehicle may be tracked to its destination(s) to aid in ensuring that the container are delivered to the appropriate facility or client location. A GPS-based proximity system may be utilized to control and track the container delivery and to confirm that the particular containers to be delivered to a particular location are in fact present at the particular location. The tracking system may be able to receive both current GPS coordinates of a vehicle on which the containers are loaded and to track the vehicle to the GPS coordinates of the particular facility or client location to which the containers are to be delivered. The tracking system computer may be operable to send to a computing device on the vehicle commands to wake-up an on-board telematics module to allow the collection of position data from the vehicle. In some embodiments, the telematics module may be connected via the vehicle's onboard diagnostics (ODBII) or CAN-BUS port with a SIM card, and an onboard modem may be present to enable communication through a wireless network. The vehicle may include one or more OEM remote access/connectivity systems that are configured to have communications with the tracking system computer vehicle in order to exchange information including GPS coordinates of the vehicle and interact with the vehicle's on-board intelligence system, such as an on-board telematics module to provide GPS location of the vehicle in real time to the tracking system computer via wireless network connections, such as 3G, 4G, or 5G cellular transmission, and/or other wireless data communication connections.

The transport vehicle may be outfitted with one or more sensors that are operable to sense whether the container(s) have been offloaded from the transport vehicle that allow the tracking system to confirm that the containers were delivered to the appropriate destination. The tracking system may be preprogrammed with the shipment information including the client company, the shipment ID and the total load of the haul, manifest data including the origin of the goods (e.g., farmer, field, etc.), the type of goods (e.g., fruit, vegetables, farmed goods, etc.) and destination of the shipment, and an itemized inventory list of object(s) and container(s). The combination of the data regarding the destination of the shipment, the GPS location data for the transport vehicle, and data from the one or more sensors identifying when the containers are removed from the transport vehicle allows the tracking system to determine whether the containers were delivered and offloaded at the destination of shipment. The data from the one or more sensors provides timing information about when the containers are offloaded, which allows the realtime GPS data correlated with the offloading time to indicate that the GPS location of the transport vehicle at the time of offloading is the destination of the container(s). The records for the containers may then be updated in the database stored in the memory of the tracking system to indicate that the containers were delivered to the GPS location of the transport vehicle at the time of offloading. If the location is the correct shipment destination according the container records, container records may be identified in the database as successfully delivered. If the GPS location does not match the shipment destination according the container records, the container records may be identified in the database as delivered in error, and the tracking system may provide an alert or other graphical communication to the user interface of the tracking system indicating the error. The one or more sensors may be one or more optical sensors (e.g., through-beam sensors, retro-reflective sensors, diffuse reflection sensors, or other optical sensors) and/or one or more compression force sensors (e.g., one or more load cells).

It is to be appreciated that embodiments of the invention may be adapted for use in a variety of different inventory environments, including not only industrial or agricultural warehouses, but also retail stores. For example, markers may be provided in the ceiling of a retail store that can be read by the camera of a customer's mobile device. An application program on the mobile device can use the camera to read the marker to determine the position of the mobile device, and thereafter respond to queries by the user to direct the user to specific locations in the store where selected items may be found. The tracking system of the present invention may also be used for long term storage facilities for hazardous materials, allowing the contents and the movements of containers stored in the facility (e.g., an underground facility) to be recorded and closely tracked.

There are additional uses for the general design of the system, broadly covering a system for identifying a position of a mobile sensor/computer combination (e.g., a mobile computing device, a vehicle with a mobile computing device mounted thereon) within an enclosed environment and then tracking the movement of the position of mobile sensor/computing device and recording and storing the movement of the mobile sensor/computer in a system memory. The system first establishes and tracks the position of the mobile sensor/computer by (1) receiving image data from the mobile sensor/computer of a marker (e.g., matrix code) within the enclosed environment, (2) computing the position of the mobile sensor/computer by pose estimation calculations based on the perceived image of the marker and the known position and dimensions of the marker, and (3) orienting and defining the position of the mobile sensor/computer within a computer-generated model (a 2 dimensional or 3 dimensional map) of the enclosed environment (e.g., as within a virtual environment). Once the system has oriented the position of the mobile computing device, the movement of the mobile computing device can be accurately tracked and recorded in the memory. The system can then locate, track and record the positions of marked inventory units within the environment.

It is an objective of the present invention to provide improved systems and methods for object location using position markers for determining the position of an electronic device or vehicle with better accuracy and reliability.

It is a further objective of the present invention to provide improved systems and methods for object location that avoids the problems of position marker obstruction by providing a system that can generate and provide real time location data for both the user and the stored objects or containers within a pre-defined space, greatly improving the efficiency of locating and tracking items within a pre-defined space, like a warehouse.

It is a further objective of the present invention to provide improved systems and methods for object location using a reliable and efficient optical markers and automated position determination techniques for vehicles within the predefined coordinate space.

It is a further objective of the present invention to provide improved systems and methods for object location using a predefined coordinate space for tracking objects and providing real-world location instructions for retrieving objects.

Additional aspects and objects of the invention will be apparent from the detailed descriptions and the claims herein.

BRIEF DESCRIPTION OF THE DRAWINGS

FIG. 1C provides a view of the image tracking system and method according to an embodiment of the invention.

DETAILED DESCRIPTION OF THE EXEMPLARY EMBODIMENTS

Reference will now be made in detail to certain embodiments of the invention, examples of which are illustrated in the accompanying drawings. While the invention will be described in reference to these embodiments, it will be understood that they are not intended to limit the invention. Conversely, the invention is intended to cover alternatives, modifications, and equivalents that are included within the scope of the invention as defined by the claims. In the following disclosure, specific details are given as a way to provide a thorough understanding of the invention. However, it will be apparent to one skilled in the art that the present invention may be practiced without these specific details.

Figure 1A:
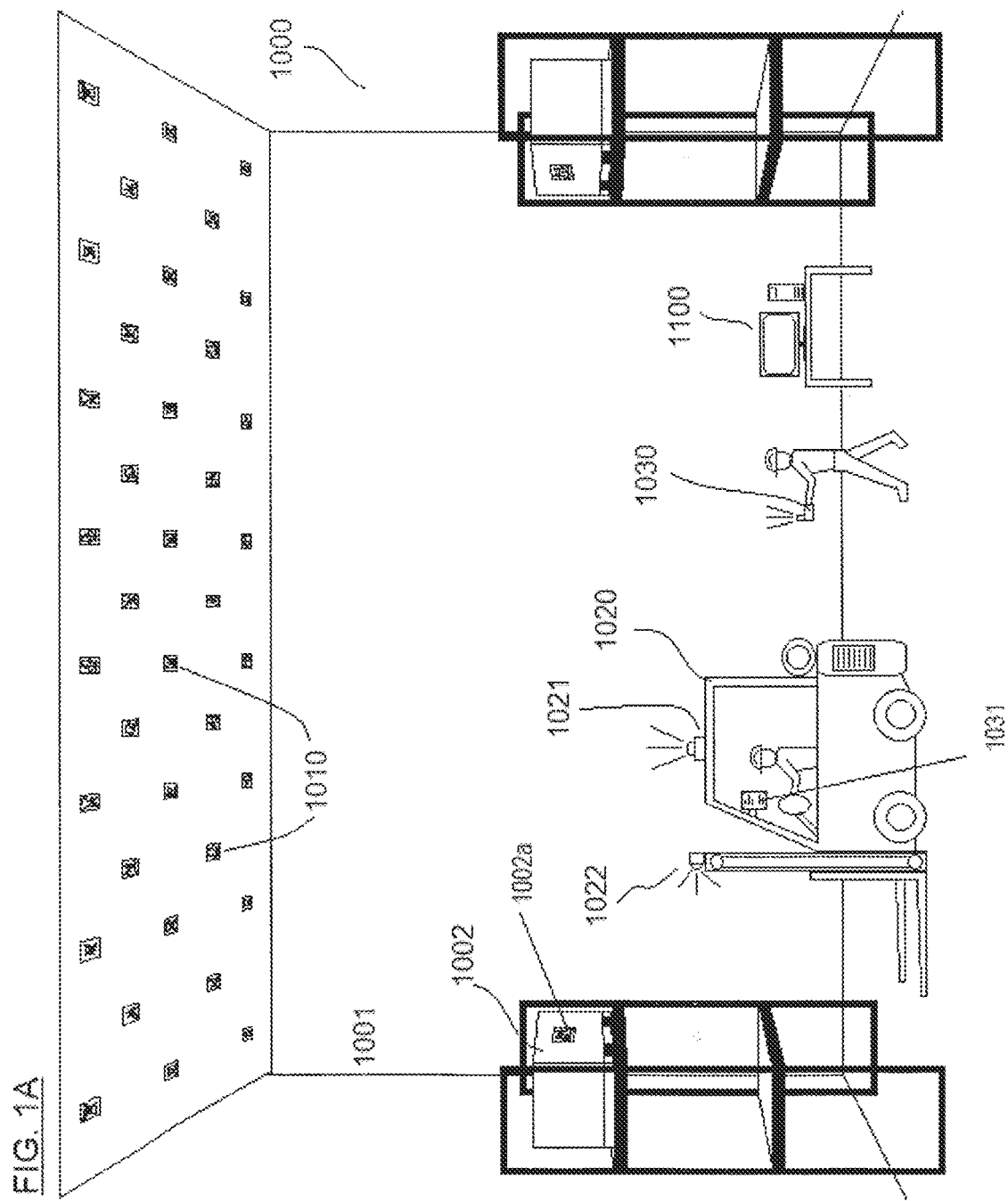
FIG. 1A provides a view of the image tracking system and method according to an embodiment of the invention.
Figure 1B:
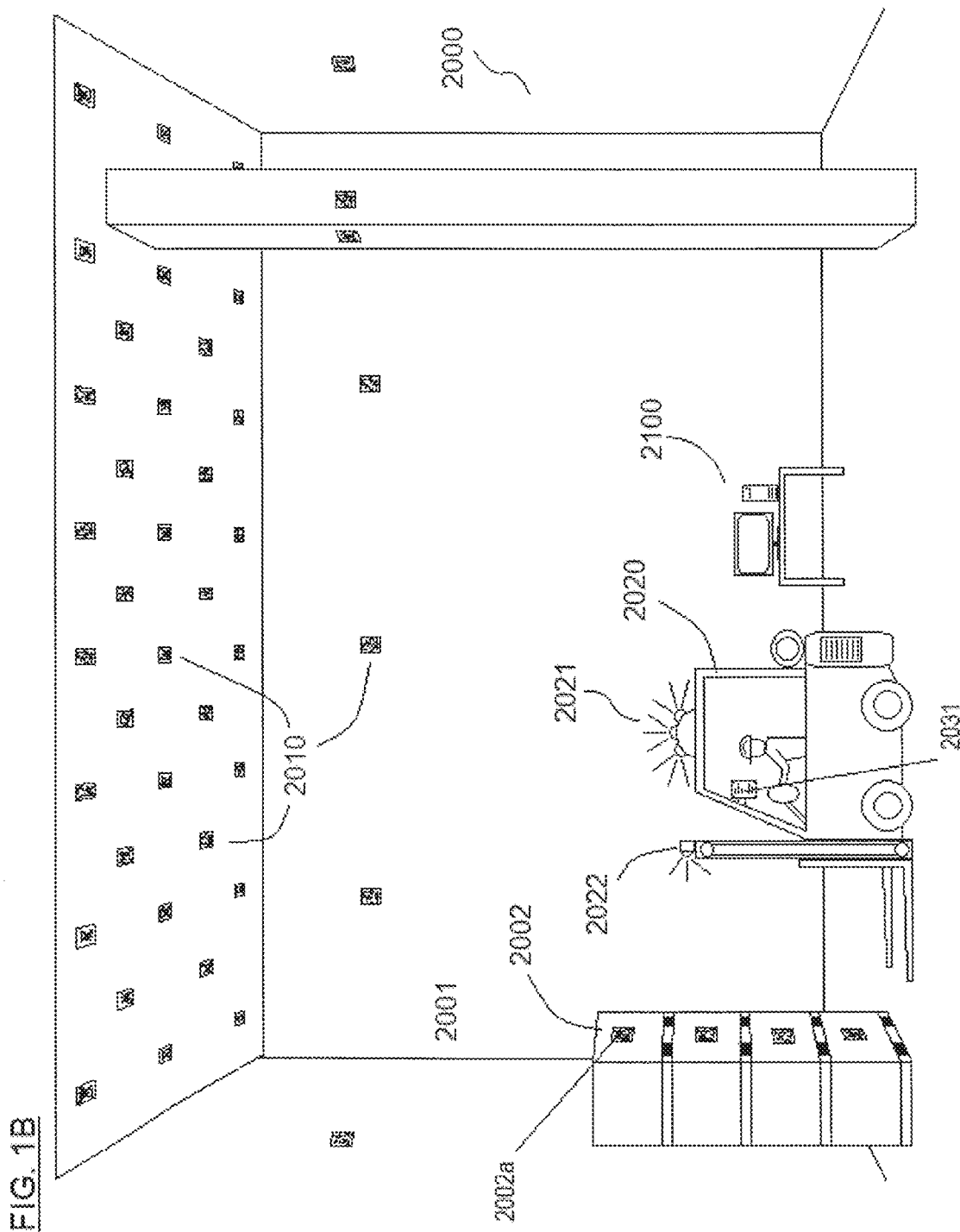
FIG. 1B provides a view of the image tracking system and method according to an embodiment of the invention.

Referring to the drawings, wherein like reference characters designate like or corresponding parts throughout the several views, and referring particularly to FIGS. 1A-1C, it is seen that the present invention includes various embodiments of a tracking system having an automated process for tracking the movement and storage of containers or objects within a pre-defined space.

As seen in FIGS. 1A and 1B, a tracking system 1000 is provided for tracking and handling containers, boxes, palettes, packages, or other objects within a pre-defined space that may be used to house or store such items. The pre-defined space may be any number of enclosures or areas that can be outfitted with machine-readable static optical markers and can be set up with defined boundaries, such as a warehouse, a retail store space, a storage yard, a hangar, etc. The example shown in FIGS. 1A-1B includes a warehouse (1001, 2001) as the pre-defined space. The pre-defined space may have machine-readable static optical markers 1010, 2010 placed in elevated areas such as the ceiling (if present), upper portions of vertical walls, upper portions of pillars or beams, lamp posts, other elevated structures, and/or other surfaces that are unobstructed by storage structures, objects or containers 1002, 2002 within the pre-defined space. The machine-readable optical markers 1010, 2010 may be attached directly to building structures without the necessity of affixing them first to a secondary surface.

The example shown in FIG. 1A includes machine-readable static optical markers 1010 positioned on the ceiling of the warehouse 1001 such that they can be viewed with a clean line-of-sight from a position on the floor of the warehouse 1001, even with containers or other structures 1002 positioned in various locations on the floor of the warehouse 1001. A sufficient number of machine-readable optical markers 1010 in pre-determined spatial arrangement are provided such that at least one position marker 1010 is visible to an image sensor (e.g., a camera mounted on a vehicle, a camera on a mobile computing device held by a person, etc.) from all locations within the pre-defined space 1001. The example shown in FIG. 1B includes machine-readable optical markers 2010 positioned on the ceiling of warehouse 2001, as well as other elevated locations that can be detected from any or virtually any position on the floor within the warehouse 2001 with a clean line-of-sight, even with containers or other structures 2002 positioned in various locations on the floor of the warehouse 2001. A sufficient number of machine-readable optical markers 2010 in pre-determined spatial arrangement are provided such that at least one position marker 2010 is visible to an image acquisition system (e.g., a camera mounted on a vehicle, a camera on a mobile computing device held by a person, etc.) from all locations within the pre-defined space 2001.

The tracking system may include a network of computing devices connected by a node 1100, which may be a general purpose computer or server that is in electronic communication with various elements of the tracking system 1000. The network node 1100 may be in wireless electronic communication with one or more mobile computing devices 1030, which may be handheld or mounted on a vehicle 1020. The mobile computing devices 1030 of the tracking system may be programmed with a number of software programs for interpreting electronic data received from image sensors (e.g., digital cameras as described herein) included in vehicles 1020 and/or mobile computing devices 1030 integrated into the tracking system, and, optionally, GPS satellite navigation receiver solutions from mobile computing devices, inertial navigation data from mobile computing devices, and other forms of data that aid in determining the location of the image sensors. The mobile computing devices 1030 may thus act as image processing hosts that execute a number of programs that are able to calculate the position of the mobile computing device 1030 and objects or containers 1002 within the warehouse 1001.

A digital model of the warehouse 1001 may be saved in a digital memory of the mobile computing devices 1030 and the network node 1100, which may serve as a digital construct in which a digital record of the location and movements of each of the containers or other objects 1002 in the pre-defined space 1001 may be recorded for reference. In some embodiments, and without limitation, rather than simply saving the coordinates of the containers or other objects 1002 within a digital map, a digital model of the container may be digitally saved as a virtual object within the digital model. The digital model of the container may include the dimensions of the container and it may be positioned within the digital model in a location that corresponds to its real-world location within the warehouse 1001. The digital model of the pre-defined space 1001 may be a virtual reality environment, in which the containers or objects are stored, as a digital copy of the actual pre-defined space (warehouse 1001), including the physical features therein. Once the pre-defined space 1001 is selected and measured for physical dimensions, a digital model of the pre-defined space may be created that includes accurate physical dimensions of the pre-defined space 1001 and all non-moveable physical features, such as stacking lighting installations, pillars, beams, interior walls and corners, multiple elevation levels, slopes, and other physical features that would impact the movement and storage of containers and other objects within the pre-defined space 1001. Additionally, a pre-determined arrangement of machine-readable optical markers 1010 may be included in the digital model. The pre-determined arrangement may take into account the distance at which an image sensor (e.g., digital cameras as discussed herein) may perceive the machine-readable optical markers 1010 with sufficient resolution for image recognition and processing software to accurately interpret the coding data on the machine-readable optical marker 1010.

The machine-readable optical markers 1010 may be machine readable matrix codes that encode the identity and position of each machine-readable optical marker 1010 within the pre-defined space 1001. Vehicles 1020 or mobile computing devices 1030 integrated into the tracking system include optical image sensors (e.g., 1021, 1022) operable to perceive the matrix codes provided on the machine-readable optical markers (e.g., digital cameras as discussed herein). These machine-readable optical markers 1010 act as coordinate references for the tracking system to allow an image processing host to calculate the locations of containers or other objects 1002 within the pre-defined space 1001, and provide instructions for locating containers or other objects 1002 once they are positioned within the pre-defined space 1001. The machine recognizable matrix codes may be arranged on the machine-readable optical markers 1010 at predetermined positions, allowing machine-readable optical marker coding translation software to determine the position of the machine-readable optical marker 1010 by analyzing the unique symbols on the machine-readable optical markers 1010. The locations of the machine-readable optical markers 1010 may be coded into the matrix code itself, and/or may be stored in an electronic memory of the image processing host or within a memory of the network node 1100. Exact position coordinates and rotational orientation are determined through computer-programmed instructions that are based upon image analysis by the image recognition and processing software of image data, i.e., camera picture elements (pixels), acquired by the image sensors of the mobile computing devices.

The machine-readable optical markers 1010 may be read by image sensors (e.g., digital cameras as discussed herein) and the image data may then be analyzed by the image recognition and processing software to interpret the coding on the machine-readable optical marker 1010 and identify the particular machine-readable optical marker 1010, the orientation of the marker relative to the image sensor that collected the image data (e.g., the rotation and translation vectors of the machine-readable optical marker relative to the image sensor), and the distance of the machine-readable optical marker 1010 from the image sensor.

The tracking system 1000 may include transport vehicles 1020 that include one or more image sensors 1022, 1021 for reading the static optical markers 1010 within the warehouse 1001. The transport vehicles 1020 may be forklifts or other transport vehicles operable to transport containers or other items 1002 within the warehouse. The one or more cameras 1021 may be positioned on an upper surface of the transport vehicle 1020 to allow for an unobstructed view of the static optical markers 1010 positioned on the ceiling of the warehouse 1001, allowing the image sensors to continuously capture images of the static optical markers 1010 to allow the image processing host to determine and update the current position of the transport vehicle 1020.

As shown in FIG. 1B, the optical markers 2010 may be positioned on various structures within the warehouse 2001, such as the ceiling, and upper portions of walls, pillars, and other structures. The static optical markers 2010 may be positioned at elevated levels such that several static optical markers 2010 are visible from any location within the pre-defined space 2001. The transport vehicles 2020 may include a plurality of image sensors 2021, 2022 for reading the machine-readable optical markers 2010 within the warehouse 2001. The plurality of image sensors 2021, 2022 may be combined in an array of image sensors 2021 that are arranged such that they cover a large area (e.g., a hemispheric view or substantially spherical view of the environment), wherein the view captures an upward facing hemispheric or substantially hemispheric view of the warehouse 2001. In some embodiments, the images provided by the plurality of image sensors may be analyzed individually by the image processing host. The array of image sensors 2021 may allow optical markers 2010 positioned on structures other than a ceiling to be captured with sufficient resolution and accurately analyzed by the image processing host. The containers or object 2002 may include machine-readable optical markers thereon (object markers 2002a), and the image sensors 2021 may capture images of the object markers 2002a. The image sensors may be located in other or additional positions on the vehicle as well. For example, in some embodiments, the static markers may be located on the ceiling and the floor of the pre-defined space, and the image sensors may be located both on the upper and lower portions of the vehicles.

The tracking systems 1000 and 2000 may also include at least one image sensor (1022 and 2022, respectively) facing in a forward or lateral direction in order to read the markers on the containers or objects 1002 and 2002. The upward facing image sensors 1021 and 2021 may be operable to capture images of optical markers positioned on the containers or objects themselves, although it is to be understood that forward or lateral facing image sensors 1022 and 2022 may also be operable to capture images of the optical markers positioned on the containers or objects.

The optical markers, both static and object markers, may be used by the tracking system to identify the real-world position of the mobile computing device, and the vehicle to which it may be attached. The image sensors 1021, 2021 may capture images of static optical markers 1010, 2010 positioned within the warehouse 1001, 2001 and analyze the images to determine the real-world location of the image sensors 1021, 2021. In the case of object markers 1002a, 2002a placed on containers or objects 1002, 2002 having known positions, the object markers may also be used by the image processing host to determine the location of a mobile computing device 1030 or vehicle 1020 or 2020 moving through the warehouse 1001 or 2001. The following steps provide an exemplary process for determining the location of the mobile computing device within the pre-defined space:

a. The image recognition and processing software analyzes the image data captured by an image sensor for the presence of optical markers (static markers 1010/2010 and object markers 1002a/2002a) and identifies optical markers present in the image data in sufficient resolution;

b. The image recognition and processing software analyzes features in the matrix code of the optical markers 1010/2010 identified in the image data to determine the orientation of the optical markers 1010/2010 relative to the image sensor through a pose estimation process;

c. The image recognition and processing software determines the real-world position of the optical markers 1010/2010 within the warehouse 1001/2001 based on the data provided in the matrix code;

d. The image recognition and processing software determines the real world position of the mobile computing device 1030/1031/2031 in the warehouse 1001/2001 by:

1. Transforming the positions of the mobile computing device 1030/1031/2031 and the optical marker 1010/2010, such that position of the optical marker 1010/2010 is used as an origin of a three-dimensional coordinate system, and 2. Calculating the position and orientation of the mobile computing device 1030/1031/2031 within the warehouse 1001/2001 based on the known position of the optical marker 1010/2010 (including a known height), the rotation and translation vectors produced by pose estimation process, an estimated distance between the optical marker 1010/2010 and the mobile computing device 1030/1031/2031 based on the number of pixels occupied by the optical marker 1010/2010 in the captured image, and other data (e.g., a known or estimated height of the mobile computing device 1030/1031/2031, and 3. In some implementations, step 2 is repeated for each of the optical markers 1010/2010 in the captured images to provide multiple calculations of the real-world position of the mobile computing device 1030/1031/2031, which may then be averaged by the image recognition and processing software to provide a precise estimate of the location; and e. The real-world position of the mobile computing device 1030/1031/2031 may then be translated to a virtual position within a computer-generated model of the warehouse 1001/2001 by the position translation software.

These steps may be performed on a continuing, intermittent basis to track the movement of the vehicle 1020/2020 or mobile computing device 1030 through the warehouse 1001/2001 and create a digital record of such movement. The image sensor(s) of the mobile computing device 1030 capture and analyze images of optical markers (static markers 1010/2010, and in some instances object markers 1002a/2002a) at intervals (e.g., at an interval length in a range of about 0.01 to about 1 second) to provide an updated position for the mobile computing device 1030 or vehicle 1020/2020 (and an object or container it is carrying) within the warehouse 1001/2001.

The image sensors 1022, 2022 also allow the tracking system to track containers or objects (e.g., 1002 or 2002) through the warehouse 1001/2001. By capturing an image of an optical marker on the container or object, the tracking system can identify the container or object 1002/2002 prior to or after the placement of the container in the pre-defined space (e.g., 1001 or 2001). Once the container or object 1002/2002 is recorded in the tracking system, the tracking system is able track and record the position thereof as it is moved into, through, and/or out of the pre-defined space 1001 or 2001. Data regarding the container or object (e.g., date, time, location, final location in the pre-defined space, etc.) may also be recorded in the memory of the tracking system in the record for the particular container or object 1002/2002.

The movement and location of the container or object 1002/2002 may be tracked by (1) first identifying the container or object 1002/2002 by manual input of the identification code and/or scanning or capturing an image of a matrix code of the object marker 1002a/2002a thereon to allow the image processing host to identify the specific container or object 1002/2002, (2) moving the container or object 1002/2002 through the pre-defined space in conjunction with a mobile computing device (e.g., on a transport vehicle 1020/2020), and (3) tracking the movement and location of the mobile computing device through the pre-defined space 1002/2002 and recording such movement and location in a memory of the image processing host. The movement and position data of the mobile computing device may be recorded as the movement and position of the associated container or object 1002/2002 that was moved in conjunction with the mobile computing device. Once the container or object 1002/2002 reaches its destination (e.g., a storage location in a warehouse), the image processing host may record such location as "stored position" for the particular container or object in a memory.

The system may also be able to monitor and track the positions of containers or objects 1002/2002 that are already within the pre-defined space 1001/2001. The object markers 1002a/2002a of many of the objects or containers 1002/2002 within the pre-defined space 1001/2001 may be perceivable by the image sensor(s) of a mobile computing device 1030/1031/2031 present in the pre-defined space 1001/2001, whether they be mounted on a vehicle 1021/1022/2021/2022 or carried by a person 1030/1031/2031. In some examples, objects or containers 1002/2002 may be moved into the pre-defined space 1001/2001 with a vehicle or other device or means that does not include a mobile computing device. In such examples, a human operator may use a mobile computing device (1021/1022/2021/2022 or 1030/1031/2031) incorporated into the tracking system to identify the objects or containers (1002/2002) after they have been positioned and stored in the pre-defined space 1001/2001. The mobile computing device (1021/1022/2021/2022 or 1030/1031/2031) may be used to deliberately capture images of the object markers 1002a/2002a on the objects or containers 1002/2002, identify their real-world locations within the pre-defined space 1001/2001, translate their positions into virtual positions within the computer-generated model of the pre-defined space 1001/2001, and record the positions in the tracking system database.

Also, mobile computing devices (1021/1022/2021/2022 or 1030/1031/2031) moving through the pre-defined space 1001/2001 may capture images and the image recognition and processing software may identify any markers that are captured within the image, including any unobscured object markers 1002a/2002a present in the image in sufficient resolution. The image recognition and processing software and the position translation software may then process the data from the marker image and calculate the position of the objects or containers 1002/2002 relative to the position of the mobile computing device (1021/1022/2021/2022 or 1030/1031/2031) within the pre-defined space 1001/2001 to (1) aid in determining the current position of the mobile computing device, and/or (2) provide an updated position for the object or container within the pre-defined space. In such embodiments, the ability of the mobile computing devices (1021/1022/2021/2022 or 1030/1031/2031) to detect the locations of objects or containers 1002/2002 having markers 1002a/2002a perceivable from the mobile computing device may allow for additional data in determining the position of mobile computing device and for verification and updates of the locations of the objects and containers 1002/2002 within the pre-defined space 1001/2001.

The location of objects or containers 1002/2002 within the pre-defined space 1001/2001 and captured in images by mobile computing device (1021/1022/2021/2022 or 1030/1031/2031) may be determined through the following exemplary process:

a. The image sensor (1021/1022/2021/2022 or 1030/1031/2031) captures an image of an object marker 1002a/2002a on a container or object 1002/2002;

b. The image recognition and processing software analyzes the image data for the presence of an optical marker 1002a/2002a, locates any object markers in the image, and then analyzes the features of the matrix code data on the object marker 1002a/2002a identified in the image data to determine the orientation of the object marker relative to the mobile computing device (1021/1022/2021/2022 or 1030/1031/2031) through the pose estimation process;

c. The image recognition and processing software determines the real world position of the object marker 1002a/2002a in the pre-defined space 1001/2001 by calculating the position and orientation of the object marker 1002a/2002a within the pre-defined space 1001/2001 based on a previously determined, known position of the mobile computing device (see process described above), the rotation and translation vectors for the object marker 1002a/2002a, an estimated distance between the optical marker 1002a/2002a and the mobile computing device (1021/1022/2021/2022 or 1030/1031/2031) based on the number of pixels occupied by the optical marker 1002a/2002a in the captured image, and other data (e.g., a known or estimated height of the mobile computing device, etc.);

d. The matrix code of the object marker 1002a/2002a may include identifying information for the particular object or container 1002/2002 that may be utilized by lookup process software to determine whether a record exists in the database of the tracking system and whether the location of the object or container 1002/2002 has been recorded;

1. If the location has been previously recorded, the lookup process software compares the position of the object or container 1002/2002 calculated by the image recognition and processing software to the recorded position of the object or container,
   a) If the calculated position and the recorded position match, the location is confirmed,
   b) If the calculated position and the recorded position do not match, the virtual location record of the object or container 1002/2002 is updated in the computer-generated model of the pre-defined space 1001/2001;

2. If the location has not been recorded, the position translation software records a virtual location of the object or container 1002/2002 in the computer-generated model of the pre-defined space.

The record for a particular object or container stored in the warehouse 1001/2001 may be created or updated automatically by the foregoing process. Such records may also be retrieved and updated by a human operator through a mobile computing device (1021/1022/2021/2022 or 1030/1031/2031), network node 1100/2100, or other electronic devices that are in electronic communication with the tracking system. For example, as shown in FIG. 1C, a human operator 3500 can use a mobile computing device 3030 to direct the human operator 3500 a particular to a particular container or object 3002. The human operator 3500 may submit a query into a lookup process software on the mobile computing device 3030 that is operable to access a database stored in the memory of the image processing host (mobile computing device 3030 or network node 3100) that includes the records of each container or object 3002 that is stored within the warehouse 3001. The query may be based on various data, such as the date of placement of the container or object 3002 in the pre-defined space 3001, the goods in the container or description of the object 3002, the lot or batch of the container or object 3002, and other relevant data that may be included in the record of the container or object 3002. The image processing host may then receive both the query data from the lookup process software and image data from an image sensor of the mobile computing device 3030 and provide directions to the container or object 3002 via directions provided on the display screen of the mobile computing device 3030. In some embodiments, the query, location, and directions process may include the following steps:

a. The mobile computing device 3030 captures images of the interior of the warehouse 3001, and image recognition and processing software analyzes the image data and provides a real-world location for the mobile computing device 3030, as discussed above;

b. The position translation software provides a virtual location for the mobile computing device 3030 in a computer-generated model of the warehouse 3001, as discussed above, and provides data regarding the virtual location of the mobile computing device 3030 to the navigation processing software;

c. The lookup process software identifies all records in the database of the tracking system to which the query data apply;

d. The lookup process software provides locations of the container(s) or object(s) 3002 identified by the query to the navigation processing software;

e. The navigation processing software uses the virtual locations of the mobile computing device 3030 and the container(s) or object(s) 3002 to calculate a shortest route between them, which may include creating one or more possible routes between the mobile computing device 3030 and the container(s) or object(s) 3002 identified by the query, taking into account the locations of all containers or objects and all physical features (e.g., pillars, shelving, walls, doorways, etc.) that are identified in the tracking system database as being within the warehouse 3001. The one or more routes may be calculated to avoid intersection with all container(s) or object(s) 3002 and physical features, and the navigation process software may then select the route having the shortest traveled distance.

f. The navigation process software may then provide the route to the human operator 3500 through the graphic display screen of the mobile computing device 3030. The route may be presented within a map on the display screen of the mobile computing device 3030 or as graphical overlay over real-time image output provided on the display screen from an image sensor of the mobile computing device 3030, wherein the navigation processing software may generate graphical indicators such as straight, curvilinear, and bent arrows that show the routed direction of travel toward the container(s) or object(s) 3002, and present such indicators over images captured from an image sensor of the mobile computing device 3030. The graphics may also include outlining or other graphic indicators to identify the specifically sought container(s) or object(s) 3002 within the images displayed on the display screen of the mobile computing device 3030. The human operator 3500 can visually follow the graphic indicators to the desired container(s) or object(s) 3002.

g. In cases in which multiple containers or objects 3002 are identified by the query, the route may include multiple destinations corresponding to the locations of each of the containers or objects 3002 within the pre-defined space 3001, and the navigation process software may calculate multiple routes between the mobile computing device 3030 and the containers or objects 3002. The navigation process software may include steps that reduce the number of required calculations, such as clustering containers and objects 3002 that are in close proximity (e.g., within the same radius of up to 10 feet) as a single point, and limiting the number of containers/objects 3002 or end points considered in the route. For example, the considered end points may be limited to up to 5.

The above-described process for providing directions may be carried out in the same way for transport vehicles (e.g., vehicles 1020 and 2020), allow the human operator to the vehicle to guide the vehicle 1020/2020 to the location of the container(s) or object(s) 1002/2002 identified by the query. The transport vehicle 1020/2020 may then be used to retrieve the container(s) or object(s) 1002/2002 and transport them as desired. In such processes, the location of the retrieved container(s) or object(s) 1002/2002 may be tracked from the stored location from which it is retrieved to its new location. A move to a new location within the pre-defined space 1001/2001/3001 may be tracked and recorded through the automated processes of the tracking system discussed herein. If the new location is a different storage space or a hauling vehicle (e.g., a train, tractor trailer, or other hauling vehicle), data regarding the movement of the object or container 1002/2002/3002 to locations outside of the pre-defined space 1001/2001/3001 may be entered manually or by other methods to connect the data from the automated processes of the tracking system with information regarding later destinations for the objects or containers 1002/2002/3002. This may allow the tracking system to be used to provide a complete record for each container(s) or object(s) 1002/2002/3002 that arrives and leaves the pre-defined space 1001/2001/3001 and associated facilities, without gaps in the record.

The integrity of records for goods is typically lost when they are combined in large lots for storage (e.g., in a warehouse). The tracking system 1000/2000/3000 of the present invention allows for automated and precise tracking of goods and containers of goods to be stored in warehouses or other storage facilities. The tracking records created by the automated processes of the tracking system 1000/2000/3000 when used in combination with reliable data regarding the source of the objects or containers 1002/2002/3002 and reliable data regarding the destination of the objects or containers 1002/2002/3002, the tracking system 1000/2000/3000 of the present invention may allow a user to trace the path and timeline of a particular object or container 1002/2002/3002 from its source through its routes of delivery to its ultimate source. Such detailed records are highly useful in situations in which goods (e.g., agricultural goods) are found to be contaminated or otherwise faulty. The detailed records of the present tracking system 1000/2000/3000 may allow for more accurate identification of the source of contamination or flaw, and may thereby reduce the volume of goods that need to be recalled from the marketplace as a result of such contamination or flaw. This may significantly improve economic efficiency and reduce the costs incurred by businesses that are required to recall goods.

The tracking system 1000/2000/3000 of the present invention may also be used by human operators to retrieve data regarding a particular container or object by reading an optical marker positioned on the container or object 1002/2002/3002. As shown in FIG. 1C, a human operator 3501 may capture an image of an optical marker on a container or object 3002, and the image data may be analyzed by the image processing host (e.g., mobile computing device 3030) to determine the identity of the particular container or object 3002 through the lookup process software. The lookup process software may then retrieve from the database of the tracking system the data stored in the record for the particular container or object 3002 and provide it on the display screen of the mobile computing device 3030. The human operator 3501 may then review the data from the record to determine the contents of the container 3002, the lot or batch of the goods within the container or the object 3002, the source of the goods in the container or of the object 3002, and various other data stored in the record. In some embodiments, and without limitation, the data in the record for the particular container or object 3002 may be updated or edited by a human operator 3501 through a mobile computing device 3030. This may be to correct an error made in earlier data entry, to change a future shipping date for the container or object 3002, to change the shipping destination for the object or container 3002, to identify the container or object 3002 as recalled or to be destroyed or quarantined in the case of a finding of contamination or flaw in goods or objects from the same lot, batch, source, etc., or other data corrections or additions. The data in a record for a particular container or object 3002 may also be accessed and altered through the mobile computing device 3030, the network node 3100, or other electronic devices that are incorporated in the tracking system 1000/2000/3000. In some embodiments, the optical identification of the container or object 3002, the lookup process, and editing process may include the following steps:

a. The image sensor captures an image of an optical marker 3002a on the selected container or object 3002.

b. The image recognition and processing software analyzes the image data for the presence of optical marker 3002a and then the matrix code data on the optical marker 3002a to identify the particular container or object 3002, and sends the identification data for the container or object 3002 to the lookup process software.

c. The lookup process software identifies the corresponding record in the database of the tracking system 3000 for the particular container or object 3002, and retrieves the data contained in the record for the particular container or object 3002.

d. The lookup process software provides the data as a graphical display on the display screen of mobile computing device 3030.

e. The lookup process software allows editing of the data in the record for the particular container or object 3002 and recording the edits to the data in the database record for the particular container or object 3002.

In some embodiments, a tracking system 4000 is provided within a pre-defined space (e.g., a geo-fenced area) for tracking objects when arriving and departing a warehouse or processing plant, as illustrated in FIGS. 2A-6. The pre-defined space may be an ingress and egress port for shipping and receiving objects or containers and may provide a corridor, passageway, docking station, tunnel, unloading/loading lane for allowing transportation vehicles to be scanned—the exemplary tracking system 4000 as seen in FIGS. 2A-5 includes a tracking station 4001 as an exit from the pre-defined space. The transport vehicle 4020 has a front, a rear, a right side (sometimes referred to as the passenger side), and a left side (sometimes referred to as the driver side). The directional vector "F" represents the front of a vehicle throughout the several views. The tracking system 4000 may have a plurality of image acquisition devices (e.g., cameras) positioned at the periphery of the station 4001. The cameras may have an optical sensor having a focal centroid placed at an elevated position (e.g., the height above a flatbed) such that the cameras have a line-of-sight operable to view the objects or containers 4002 received or prepared for shipment from the pre-defined space.

Figure 6:
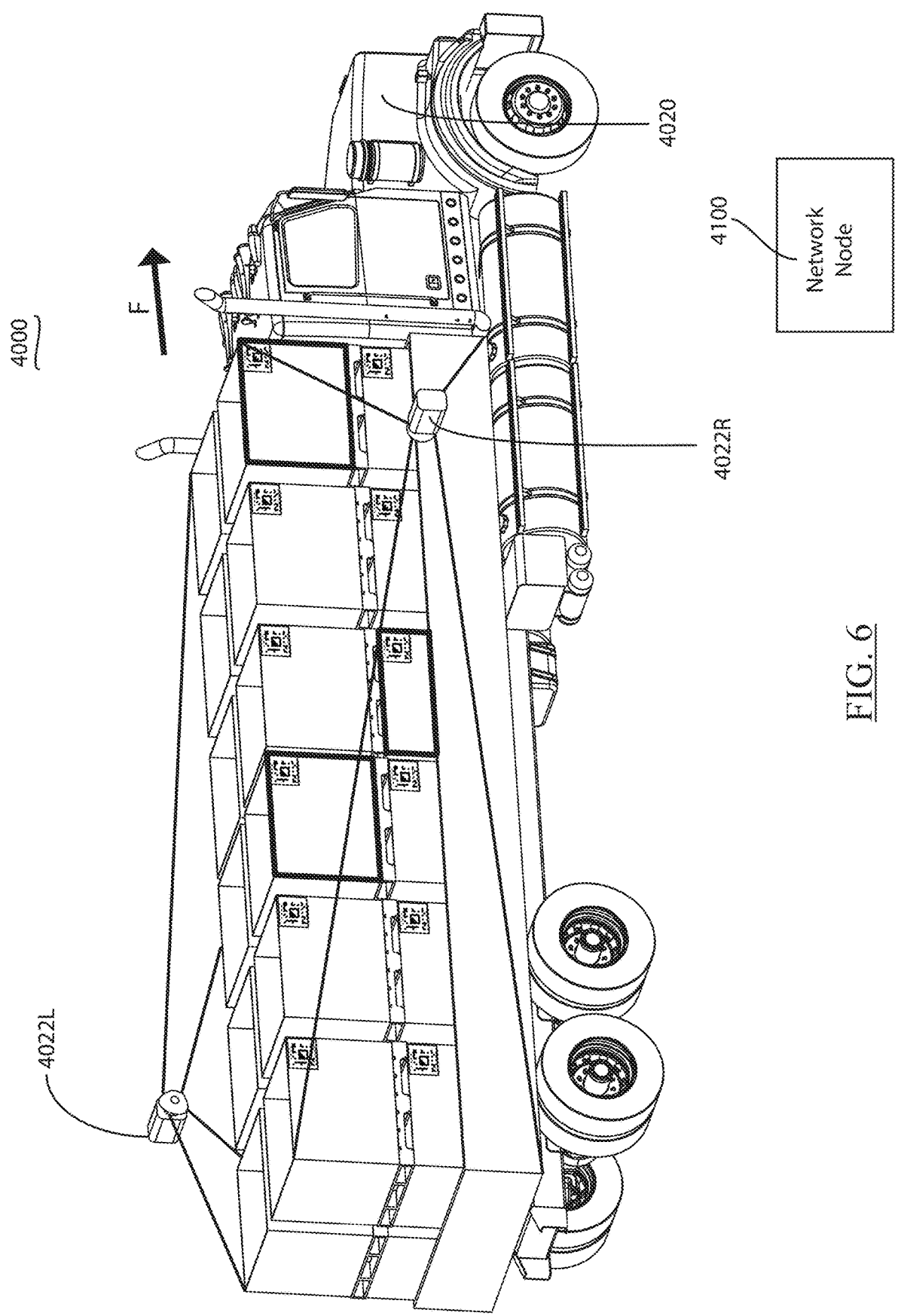
FIG. 6 provides a view of the image tracking system and method according to an embodiment of the invention.

A transport 4020 typically hauls a plurality of different objects/containers 4002, each equipped with a unique optical marker 4002a containing object data retrievable from the network node database. The plurality of cameras 4022 may be operable to continuously scan all the objects or containers 4002 for the presence of an optical marker 4002a as the vehicle 4020 travels through the station 4001. The cameras in such embodiments are preferably in a fixed location but may be mounted to a swivel that is operable to cycle back and forth at a predetermined rate. The transport vehicle 4020 may travel through the station 4001 at speed up to about 15 miles per hour during the validation process. The example shown in FIG. 6 illustrates a pair of cameras 4022 positioned at the periphery of the station 4001, where a first camera 4022L has a position orthogonal to one side of the station 4001 and operable to scan a vehicle 4020 left side and a second camera 4002R has a mirrored position opposite to the first camera operable to scan the transport vehicles 4020 right side. In some embodiments, a weighing station may be positioned in the predefined space 4001 and the weight of the transport vehicle 4020 may be measured and compared to the net weight of the shipment 4007 expected for the vehicle for verification by the network node.

Figure 2A:
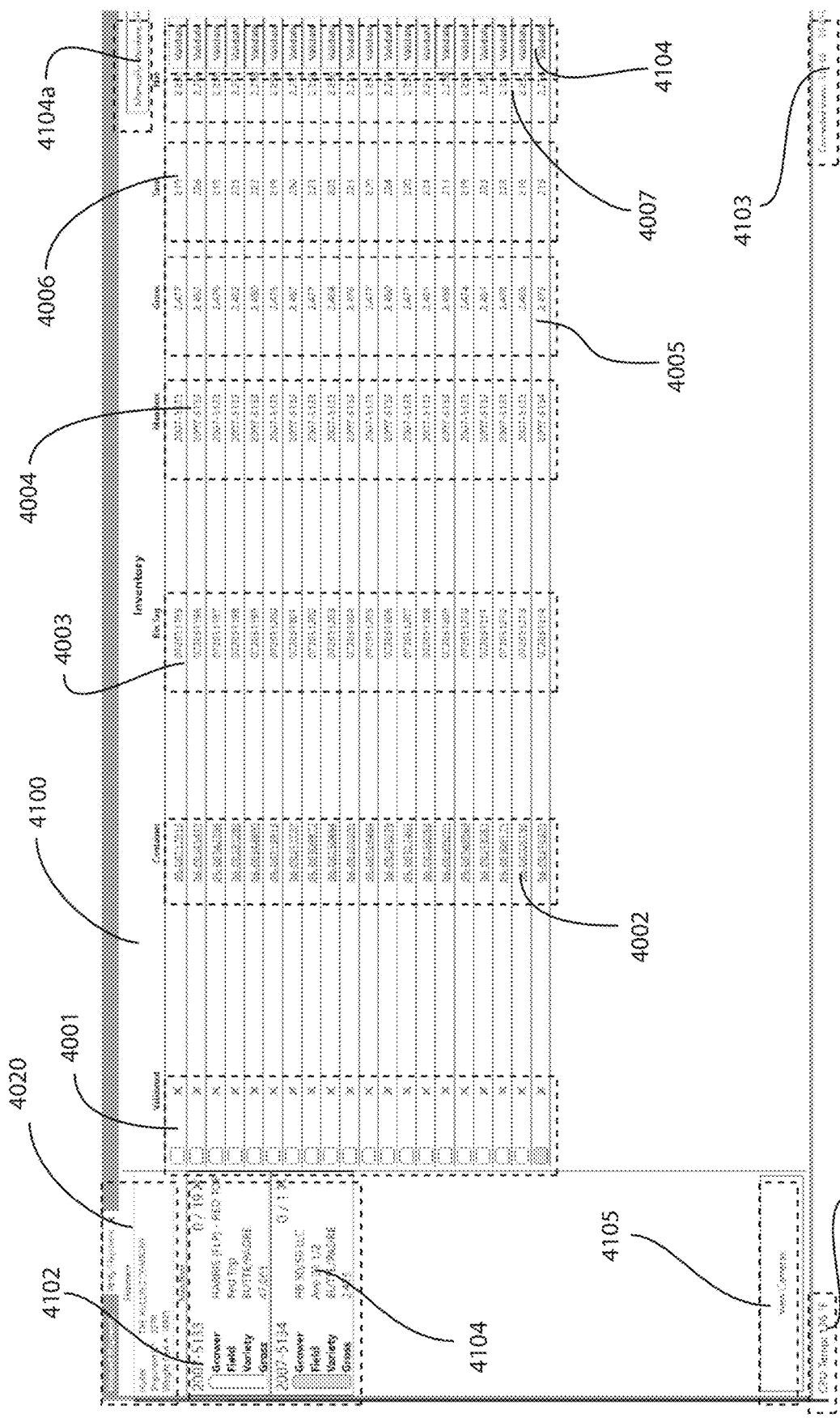
FIG. 2A provides a view of the image tracking system and method according to an embodiment of the invention.
Figure 2B:
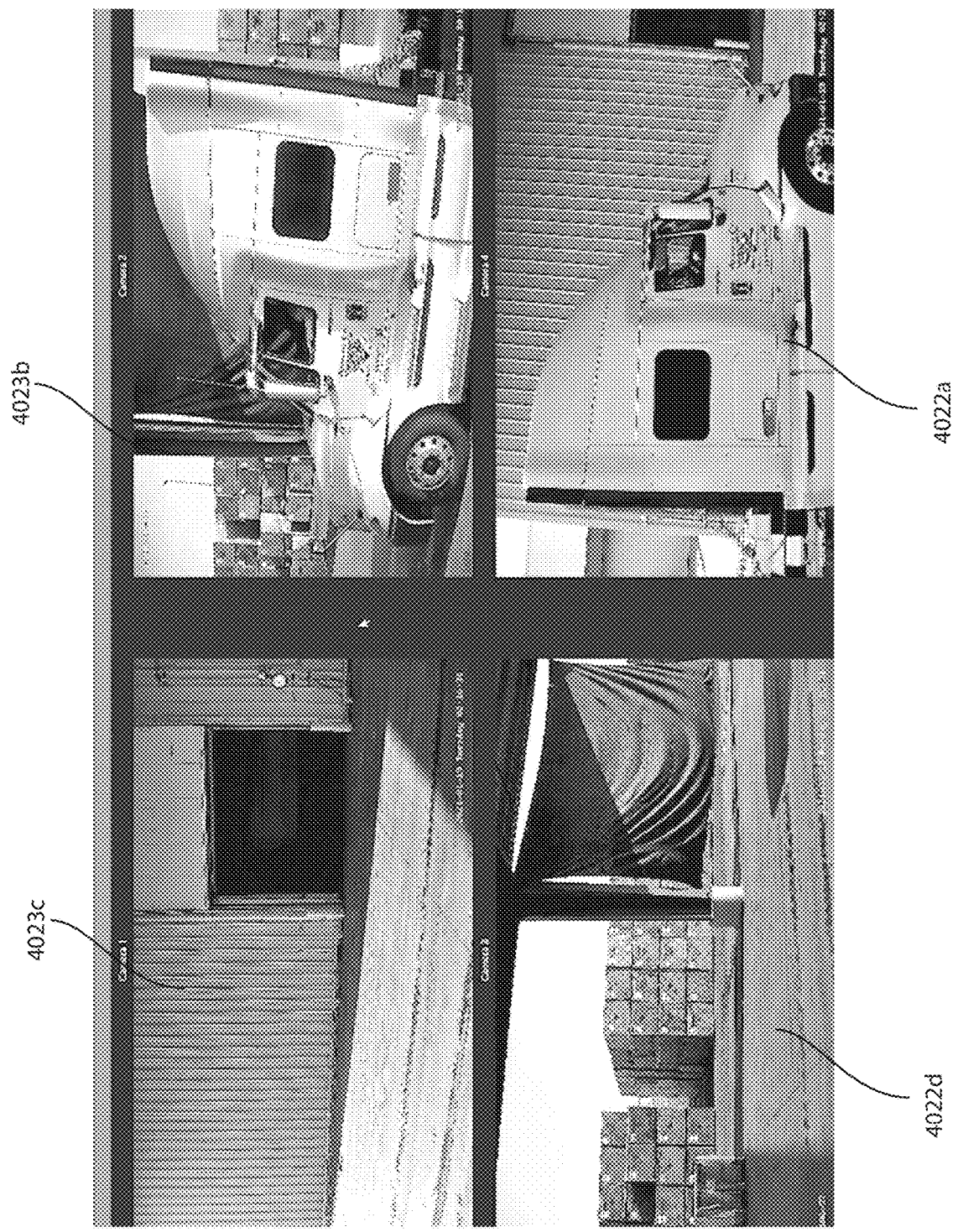
FIG. 2B provides a view of the image tracking system and method according to an embodiment of the invention.
Figure 3A:
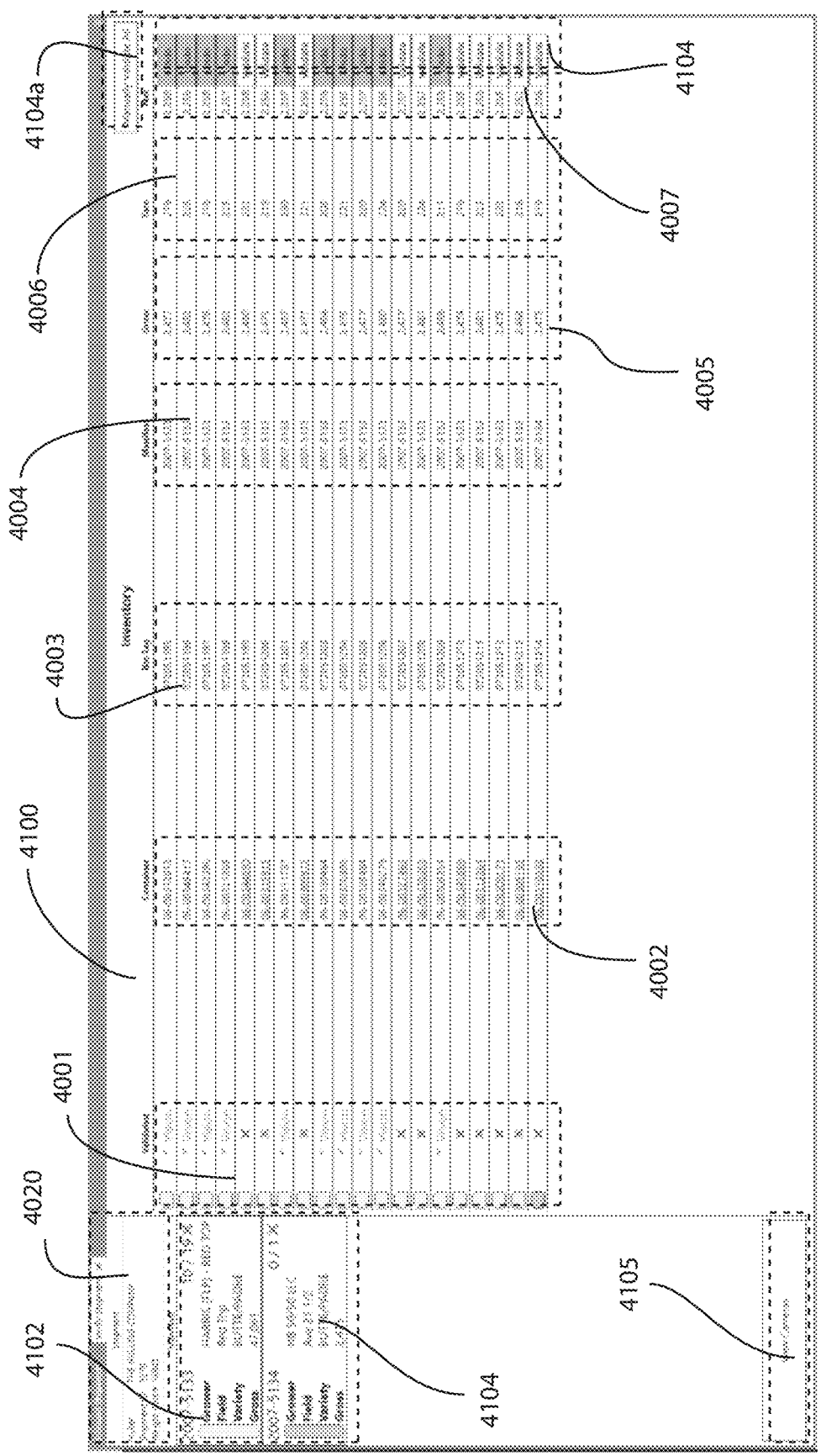
FIG. 3A provides a view of the image tracking system and method according to an embodiment of the invention.
Figure 3B:
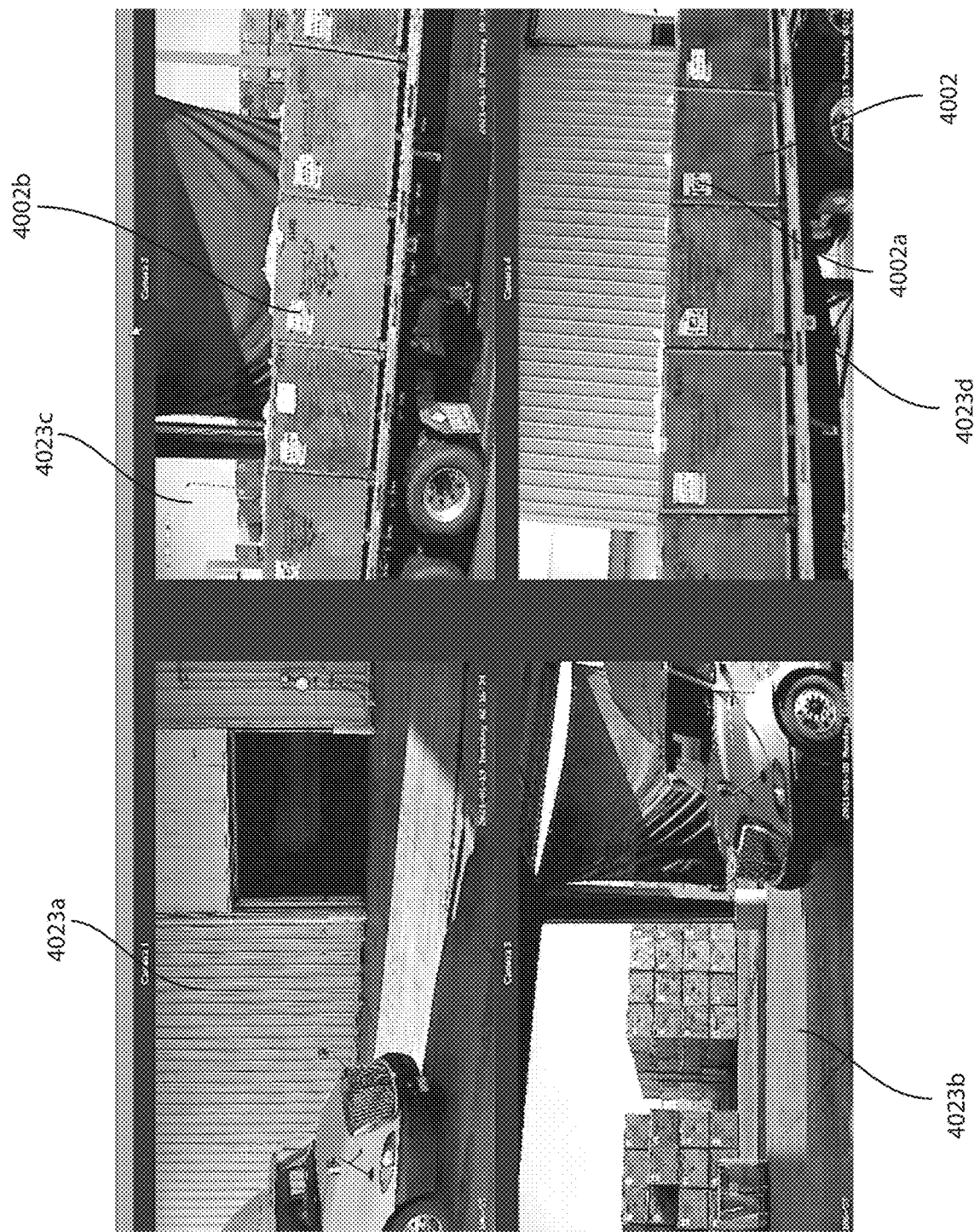
FIG. 3B provides a view of the image tracking system and method according to an embodiment of the invention.
Figure 4A:
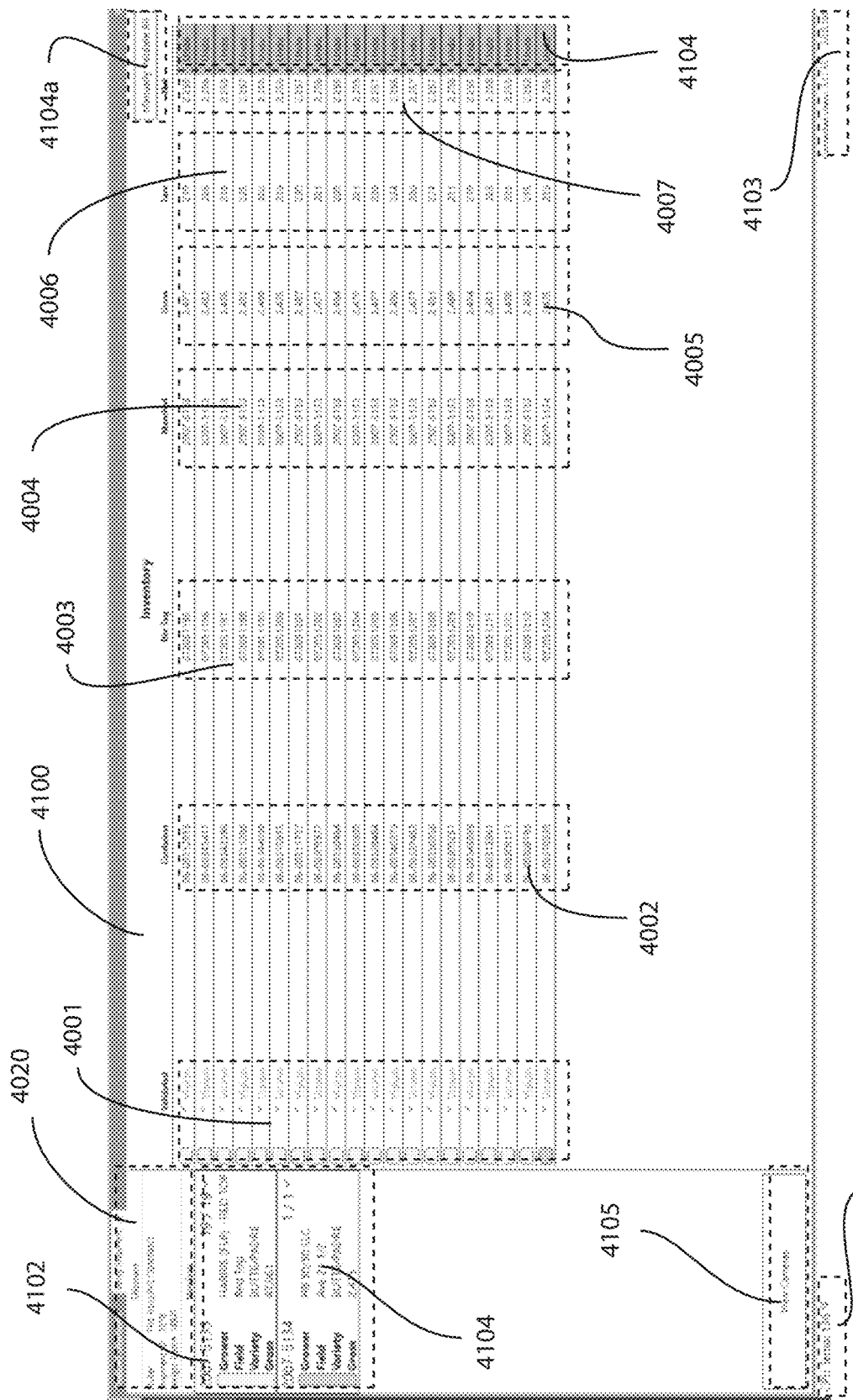
FIG. 4A provides a view of the image tracking system and method according to an embodiment of the invention.
Figure 4B:
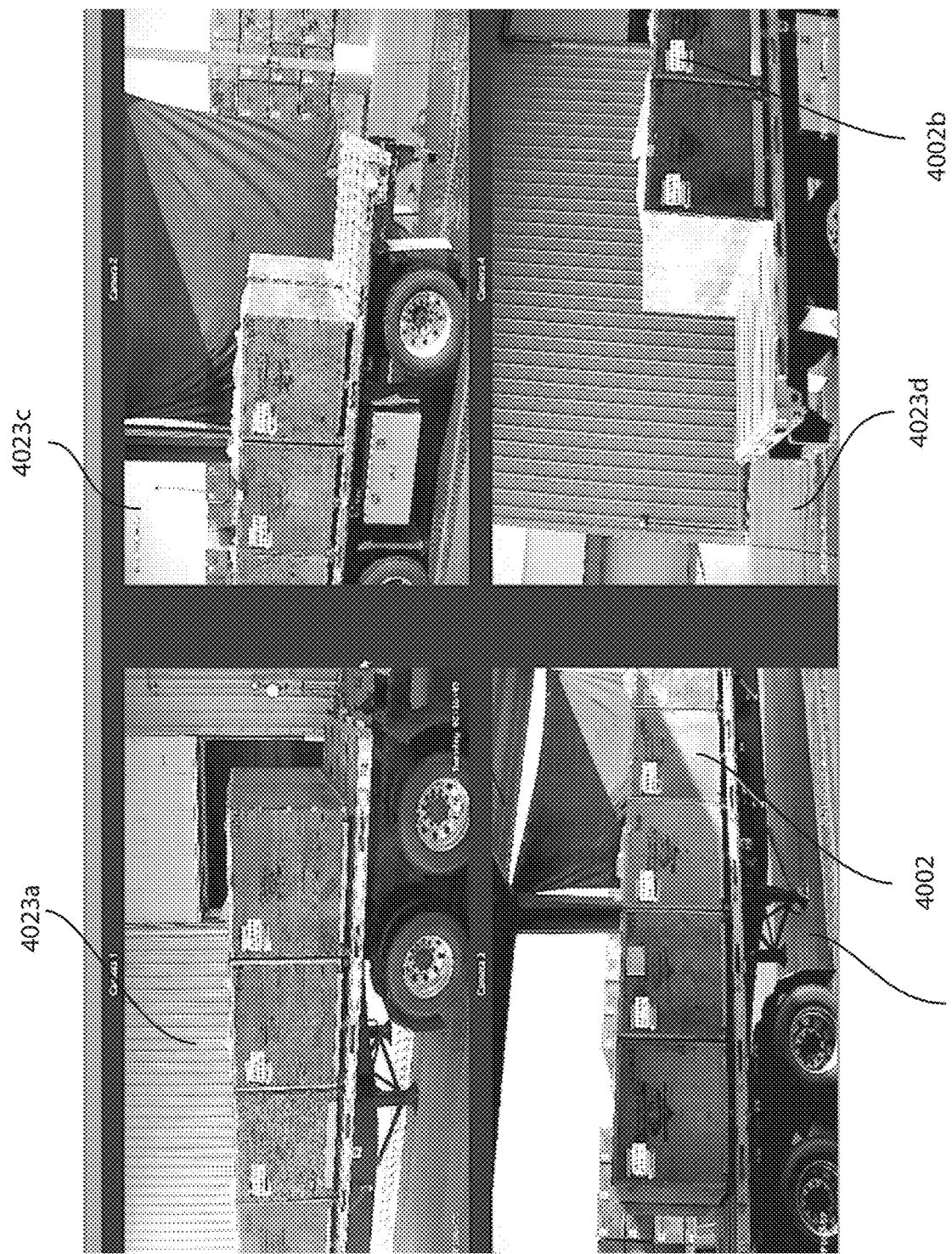
FIG. 4B provides a view of the image tracking system and method according to an embodiment of the invention.
Figure 5:
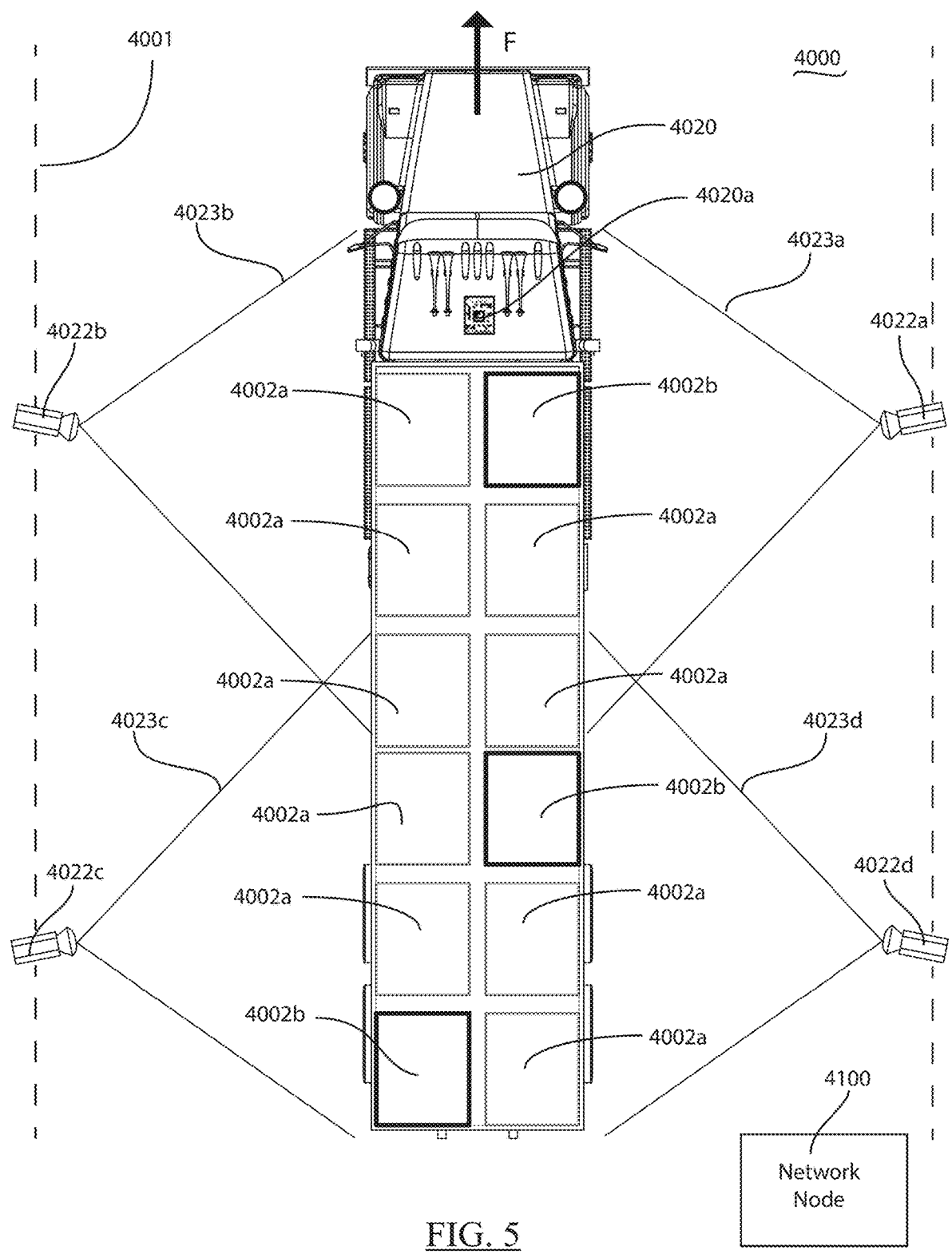
FIG. 5 provides a view of the image tracking system and method according to an embodiment of the invention.

FIG. 5 illustrates the cameras 4022a-4022d having exemplary fields of view 4023a-4023d that correlates with the video feed snapshots shown in FIGS. 2B, 3B, and 4B. FIGS. 2A-4B illustrates an exemplary user interface 4100u of a tracking systems network node 4100 as stated above. The network node interface 4100u displays real-time data of an inventory list for a shipment 4120, including the transporter of the goods, the goods in transport 4102, the shipping location 4104, the object/container identification number 4002, a bin tag 4003, the objects assigned manifest number 4004, the objects gross weight 4005, tare weight of the bin/container 4006, and the combined weight of the object and container (net weight 4007). The user interface 4100u provides an operator with individual manual validation switches 4104 operable to validate one object in the itemized inventory list, a manual validation toggle 4104a operable to validate all items in an inventory list, and a camera view switch 4105 operable to display a video feed 4122 for each of the cameras 4022a-4022d. The user interface displays a validation status 4011 corresponding to an object/container 4002 in the itemized list, network node health data 4101, and user data 4103, including the number of users on the node and the corresponding IP address. The tracking system 4000 may have two pairs of cameras, a right pair and a left pair of cameras having a fixed position at the periphery of the station 4001 and having a field of view 4023 operable to scan the interior of the station 4001. The right pair of cameras include a first camera 4022a is at a forward position on the right passenger side, a second camera 4022b is at a forward position on the left driver side, a third camera 4022c is at a rearward position on the right side, and a fourth camera 4022d at a rearward position on the driver side. The network node 4100 may have a wired or wireless connection with the cameras 4022a-4022d operable to display a live video feed 4122 on the user interface 4100u when the camera viewing switch 4105 is enabled and send the images from the cameras to the image recognition and processing software for analysis.

A user may manually load an itemized inventory list into the network node interface 4100u to verify an inbound or outbound shipment with data retrieved from a node database. The cameras 4022a-4022d may provide a video feed to the image recognition and processing software for analysis. When a vehicle 4020 passes through the station 4001, the image recognition and processing software may analyze the video feed 4122 of the cameras 4022a-4022d for a machine-readable optical marker 4002a positioned on an object/container 4002. The coding of the optical markers 4002a identifies the object/container 4002, and the network node 4100 may retrieve container/object data to determine if the transport manifest 4004 includes the object 4002. If the system confirms the object/container 4002 is in the correct location, the processing software may automatically validate the object status 4001 on the user interface 4100u. The following steps outline an exemplary process for verifying if an object 4002 is on a transport vehicle in the predefined space 4001 and updating the user interface 4100u with a validation status of the object, and approving an outbound or inbound shipment:

a. The image recognition and processing software analyzes and scans the image data captured by the cameras 4022a-4022d for the presence of an object marker 4002a and identifies the object markers present in the image data in a sufficient resolution.

b. The processing software determines if the object marker 4002a in the image data is within the predefined space 4001 and corrects the orientation of the marker using Euclidean, affine, projective, and pose estimation transforms to orient the object marker to the known shape and determine if the distance using the ratio of the known size of the object marker 4002a to the number of pixels occupied by the marker in the image, which may provide an approximate measure of the distance between the camera 4022 and the object marker 4002a.

c. The image recognition and processing software may analyze features in the matrix code of the object marker 4002a and retrieve object data corresponding to the object 4002 from the network node 4100 memory for determining if the object 4002 is expected in the cameras 4022a-4022d field of view 4023.

d. The object/container validation status 4011 may switch to a valid state on the user interface 4100u in real-time when the network node 4100 verifies the object 4002 is on board the correct transport 4020.

e. The video feed 4122 containing the optical marker 4002a is superimposed with a graphical overlay 4002b that tracks over the optical marker 4002a in the camera feed. If the validation status 4011 is invalid, the video feed 4122 containing the invalid marker may be superimposed with a graphical marker flagging the object/container 4002 for inspection.

f. The network node 4100 determines if all the objects 4002 in the inventory list and manifest are on the transport 4020 and may confirm on the user interface 4100u the approval of an inbound or outbound shipment.

These steps may be performed on a continuing, intermittent basis to confirm that the objects/contents of a transport match the manifest of the shipment. The image sensors (e.g., cameras) may capture additional optical markers 4002a in the image data, and the processing software may determine if the object is in a static position and not on the transportation vehicle 4020. The network node 4100 may be operable to perform a distance calculation to eliminate reading container IDs on bins, not on the transport vehicle 4020. For example, a warehouse may have a docking gate or door open, and a plurality of unused bins may be stored in the immediate area outside the predefined space 4001. The empty bins may have optical markers on the exterior surface, and the image processing software may be operable to reject the optical markers for analysis based on working distance calculations and a determination of an optical marker out of the camera's field of view. If the network node 4100 image processing system fails to detect an object, the individual validation switches 4104 may be manually validated for the undetected objects/containers 4002, and the inventory list of an inbound or outbound shipment may be verified.

In some embodiments, a vehicle may have an optical marker 4020a on the vehicle 4020 top surface, and a camera may be positioned at the inlet of the predefined space 4001 for reading the matrix coding of the optical marker 4020a. The vehicle optical marker 4020a may correspond to an inventory list in the network node 4100 and may initiate the loading of the inventory list onto the user interface. When a plurality of vehicle optical markers 4020a are in the camera's field of view, the processing software may determine the distance of the optical marker 4020a, and a network node 4100 may generate a shipment validation queue, where the distance of the optical marker corresponds to the vehicle's position in the queue. In such embodiments, the validation process may be autonomously engaged, and an inbound and outbound shipment may be verified.

Figure 7:
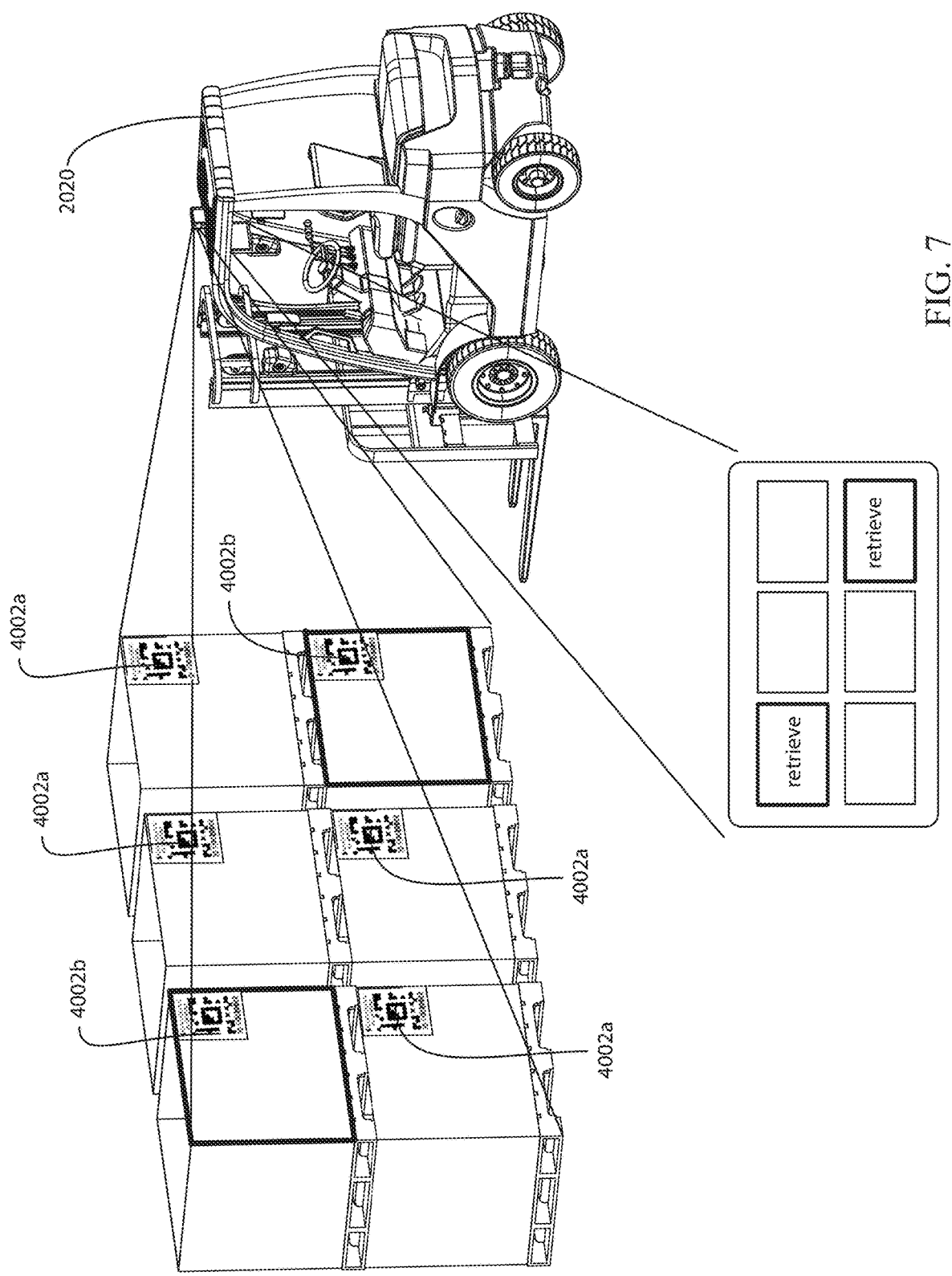
FIG. 7 provides a view of the image tracking system and method according to an embodiment of the invention.
Figure 8:
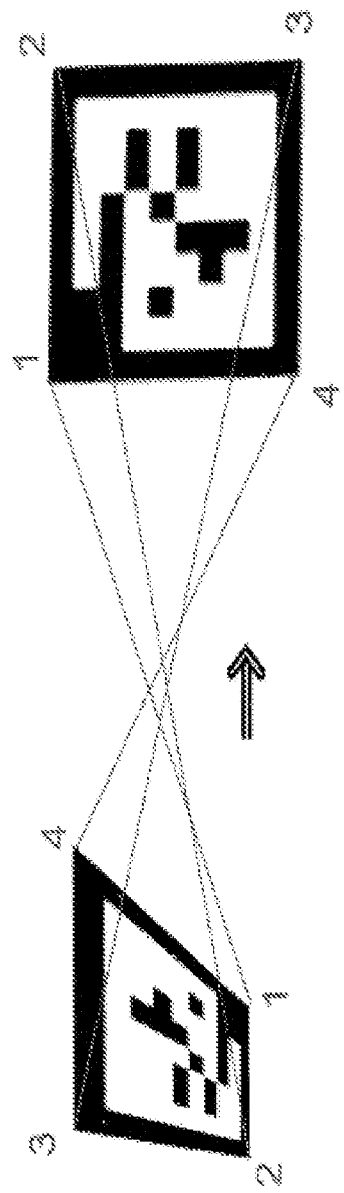
FIG. 8 provides a visual representation of a transformation using translation and rotation vectors.
Figure 9:
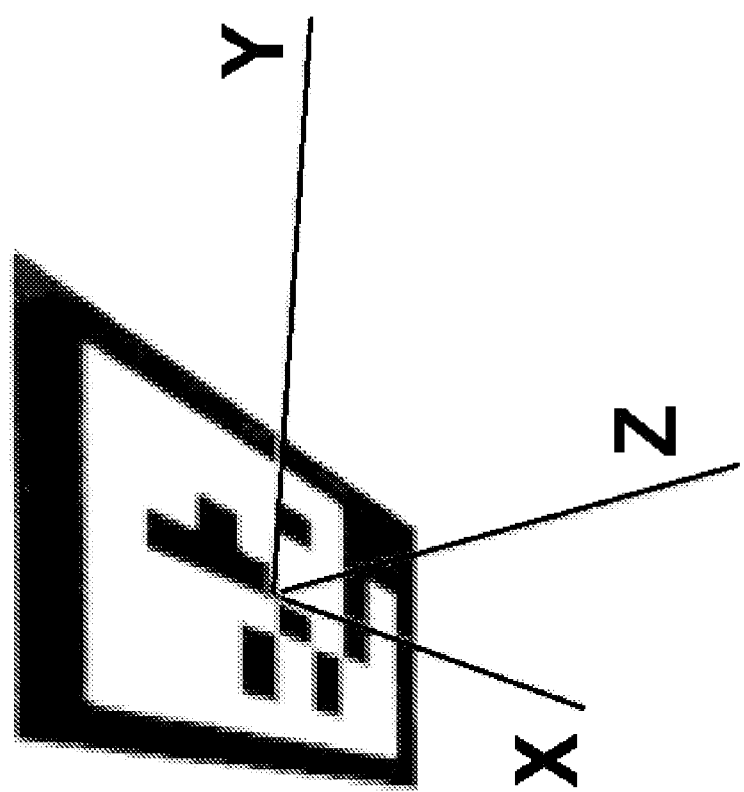
FIG. 9 provides a visual representation of a transformation using translation and rotation vectors.

FIGS. 2A-5B illustrates the steps for validating twenty containers in a manifest. FIG. 2A shows an inventory list on the user interface 4100u and the validation status 4011 for each object 4002 listed in the manifest 4004 because no optical markers 4002a are captured in the video feed 4122 provided by FIG. 2B none of the objects/containers on the manifest are validated. FIG. 3A illustrates the network node interface 4100u of FIG. 2A midway through the validation process, the user interface shows ten objects 4002 marked as validated in the verification column 4011. The user interface 4100u of FIG. 3A corresponds to the video feed 4122 of FIG. 3B. The video feed 4122 shows camera view 4023c having five optical markers 4002a in the camera 4022c's field of view, the video feed 4122 of camera view 4023d of FIG. 3B shows four optical markers 4002a in the camera 4022d's field of view. The objects/containers 4002 validated by the network node 4100 are overlayed with an identification marker 4002b superimposing over the object marker 4002a in the video feed 4122 (see FIGS. 6-7).

Once an object verification is successful, the object does not need to remain in a camera's field of view, enabling the transport vehicle 4020 to travel through the station 4001 without stopping. FIG. 4A illustrates the user interface 4100u of FIGS. 2A and 3A with all the objects/containers validated in the inventory list. Each of the objects in the video feed of FIG. 4B has an identification marker 4002b superimposed over the optical marker 4002a for a user to identify the object remotely. Once all objects/containers 4002 have been verified by the network node 4100 the shipment is validated, and the database may update with the shipment's status (e.g., arrival confirmed or prepared for delivery).

The network node interface 4100u may be operable to modify the video feed with an overlay identification marker 4002b using methods similar for determining the optical marker 4002a. The image recognition and processing software may transform the identification marker 4002b for projection onto the optical marker 4002a in the video feed 4122. The processing software may continuously track the optical marker 4002a, and the identification marker 4002b may be superimposed onto the optical marker 4002a to identify the object/container in the optical sensors field of view. The transformations may utilize transforms for reorienting the optical marker 4002a to accurately rotate and translate the identification marker for projection of the marker 4002b in the video feed 4122. Transforms may include Euclidean, affine, projective, and pose estimation methods for accurately projecting over the optical marker. The network node 4100 may use the three-dimensional data from the node database to determine the size of the object/container 4002 to display an identification marker 4002b that scales around the object/container 4002 actual size. The identification marker may provide a bounding box identifying the optical marker, highlight the optical marker with a color, provide object/container data including the weight, type, bin tag 4003, and container id 4002 over the machine-readable optical marker 4002. The identification marker 4002b may be superimposed over the object marker 4002a in the video feed 4122 using the following steps:

a. The image recognition and processing software analyzes the image data captured by the cameras 4022a-4022d for optical markers 4002a and identifies optical markers present in the image data in a sufficient resolution;

b. The image recognition and processing software analyzes features in the matrix code of the optical markers 4002a identified in the image data to determine the orientation of the optical markers 4002a relative to the image sensor through two-dimensional and three-dimensional transforms;

c. The network node 4100 generates an identification marker 4002b with data corresponding to the optical marker 4002a and determines the size and position of the identification marker 4002b, based on the determining the orientation of the optical marker 4002a relative to the image sensor; and d. The image recognition and processing software superimpose the identification marker 4002b over the optical marker 4002a in video feed 4112.

CONCLUSION/SUMMARY

The present invention provides systems and methods for tracking containers and objects in a storage and shipping environment that allows for automated identification, tracking, and data record keeping. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

The invention claimed is:

1. A system for generating and verifying an electronic manifest when preparing or receiving a shipment of objects within a predefined space, comprising:
   a. a plurality of unique object markers positioned on each of said objects, the objects being loaded on a transportation vehicle;
   b. a predefined space having a plurality of electronic image acquisition devices having a machine vision system, the machine vision system comprising an image sensor and image capture electronics, for acquiring images of said objects;
   c. an image processing system for analyzing pixels in the acquired image to determine an identity of each object marker in said acquired image, retrieve object data from a database of each object marker in said acquired image, and determine the distance of said object marker relative to the image acquisition devices; and
   d. a user interface operable to display an itemized inventory list of objects in an electronic manifest, a video feed of said plurality of electronic image acquisition devices and superimpose an identification marker over said object markers in said video feed,
wherein said image processing system is operable to continuously scan said predefined space for object markers and determine the position, orientation, and distance of said object based on said unique object marker within said predefined space relative to said image acquisition device, validate said object on said electronic manifest by comparing said object data with manifest data to confirm the appropriate object is loaded on said transportation vehicle, and superimpose said identification marker in said video feed over said object marker using said position, orientation, and distance of said marker.

2. The system of claim 1, wherein said image processing system is operable to analyze optical features within each of said object markers to read coding provided in said optical features and retrieve identification data from said coding.

3. The system of claim 2, wherein said image processing system determines if said identification data corresponds to one of said plurality of objects loaded in said inventory list and changes the status of the object to validated in said user interface.

4. The system of claim 1, wherein said predefined space includes a first side and a second side operable to provide an elongated passageway operable to scan a driver and passenger side of said transportation vehicle.

5. The system of claim 1, wherein said user interface is loaded with an inventory list containing a plurality of objects.

6. The system of claim 1, wherein said distance, position, and orientation is determined by said image recognition and processing software using pose estimation, Euclidean, affine, projective, and signed distance transforms.

7. A method for tracking a plurality of objects in a predefined space and validating an itemized inventory list on a user interface of a server computer for verification of an inbound or outbound shipment, comprising:
   a. placing a unique object marker on each of said plurality of objects loaded onto a transport vehicle, each of said unique object markers having a machine-readable code corresponding to a record in a database on said server computer that includes identification data and data regarding the object on which said unique object marker is positioned;
   b. placing a plurality of image acquisition devices at predetermined locations in said predefined space, each of said image acquisition devices in communication with image recognition and processing software on a machine-readable memory of said server computer, and displaying a video feed of an acquired image on said user interface;
   c. loading said itemized inventory list onto said user interface, said itemized inventory list including a validation status, an identification number, and the goods for each item in said inventory list;
   d. analyze said acquired images with said image processing software to identify if a unique object marker is present in said image acquisition devices field of view, calculating the distance, position and orientation of the object to determine if the object is within said predefined space;
   e. retrieve object identification data for said unique object markers within said predefined space and determine if said identification data of said objects matches an item in said inventory list; and
   f. changing said validation status of said item to validated based on said determine if said identification data of said objects match an item in said inventory list,
wherein said video feed of said predefined space is a stream of captured images continuously analyzed by said image recognition and processing software for unique objects markers and object data corresponding to said unique object marker is retrieved from said database and compared to said inventory list until each of said item in said inventory list is validated on said user interface and said outbound or inbound shipment is validated.

8. The method of claim 7, further comprising:
   a. generating a unique identification marker with said processing software, said unique identification marker having said validation status and identification number of a detected unique object marker in said predefined space;
   b. superimposing said identification marker over said unique object marker in said video feed based on said distance, position and orientation calculation; and
   c. tracking said unique object marker in said video feed and modifying said superimposing said identification marker based on new distance, position, and orientation calculation.

9. The method of claim 8, wherein said server computer determines if said identification data of said objects matches an item in said inventory list, and if said identification data fails to match an item in said inventory list the object is flagged for review with an invalid identification marker superimposed over the unique object marker and is added to the inventory list as an object requiring review from an operator.

10. The method of claim 8, further comprising an image acquisition device positioned outside of said predefined space and is operable to identify a machine-readable optical marker positioned on said transport vehicle.

11. The method of claim 10, wherein said transport vehicle machine-readable optical marker corresponds to an inventory list in said computer database and is operable initiate a loading function that uploads said inventory list to the said user interface.

12. The method of claim 7, wherein each of said plurality of image acquisition device further comprising a machine vision system that includes an image sensor and image capture electronics, for acquiring images of said predefined space for processing in image recognition and processing software.

13. A method for tracking a plurality of objects in an inbound or outbound shipment, comprising:
   a. placing a unique object marker on each of said plurality of objects loaded onto a transport vehicle, each of said unique object markers having a machine-readable code corresponding to a record in a database on a server computer that includes identification data and data regarding the object on which said unique object marker is positioned;
   b. placing a plurality of image acquisition devices at predetermined locations in a predefined space, each of said image acquisition devices in communication with image recognition and processing software on a machine-readable memory of said server computer;
   c. loading an itemized inventory list onto a user interface, said itemized inventory list including a validation status and identification information regarding each of said plurality of objects;
   d. analyze said acquired images with said image processing software to identify if a unique object marker is present in said image acquisition devices field of view, calculating the distance, position and orientation of the object to determine if the object is on said itemized inventory list; and
   e. changing said validation status of said item to validated based on said unique object marker determine if said identification data of said objects match an item in said inventory list, wherein said distance, position, and orientation is determined by said image recognition and processing software using pose estimation.

14. The method of claim 13, wherein said video feed of said predefined space is a stream of captured images continuously analyzed by said image recognition and processing software for unique objects markers and object data corresponding to said unique object marker is retrieved from said database and compared to said inventory list until each of said item in said inventory list is validated on said user interface and said outbound or inbound shipment is validated.

15. The method of claim 13, further comprising:
   a. generating a unique identification marker with said processing software, said unique identification marker having said validation status and identification number of a detected unique object marker in said predefined space;
   b. superimposing said identification marker over said unique object marker in said video feed based on said distance, position and orientation calculation; and
   c. tracking said unique object marker in said video feed and modifying said superimposing said identification marker based on new distance, position, and orientation calculation.

16. The method of claim 15, wherein said server computer determines if said identification data of said objects matches an item in said inventory list, and if said identification data fails to match an item in said inventory list the object is flagged for review with an invalid identification marker superimposed over the unique object marker and is added to the inventory list as an object requiring review from an operator.

17. The method of claim 15, further comprising an image acquisition device positioned outside of said predefined space and is operable to identify a machine-readable optical marker positioned on said transport vehicle.

18. The method of claim 17, wherein said transport vehicle machine-readable optical marker corresponds to an inventory list in said computer database and is operable initiate a loading function that uploads said inventory list to the said user interface.

19. The method of claim 13, wherein each of said plurality of image acquisition device further comprising a machine vision system that includes an image sensor and image capture electronics, for acquiring images of said predefined space for processing in image recognition and processing software.

20. The system of claim 13, wherein said distance, position, and orientation is further determined by said image recognition and processing software using Euclidean, affine, projective, and signed distance transforms.

* * * * *